United States Patent
Seo et al.

(10) Patent No.: US 9,844,050 B2
(45) Date of Patent: Dec. 12, 2017

(54) METHOD AND APPARATUS FOR ALLOCATING RESOURCES TO MULTIPLE SITES WHICH USE SAME FREQUENCY BAND

(71) Applicant: LG ELECTRONICS INC., Seoul (KR)

(72) Inventors: Dongyoun Seo, Seoul (KR); Yunjung Yi, Seoul (KR); Bonghoe Kim, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 149 days.

(21) Appl. No.: 14/779,301

(22) PCT Filed: Apr. 3, 2014

(86) PCT No.: PCT/KR2014/002891
§ 371 (c)(1),
(2) Date: Sep. 22, 2015

(87) PCT Pub. No.: WO2014/163415
PCT Pub. Date: Oct. 9, 2014

(65) Prior Publication Data
US 2016/0057741 A1     Feb. 25, 2016

Related U.S. Application Data

(60) Provisional application No. 61/808,186, filed on Apr. 3, 2013.

(51) Int. Cl.
*H04W 72/04* (2009.01)
*H04J 4/00* (2006.01)
(Continued)

(52) U.S. Cl.
CPC ............. *H04W 72/044* (2013.01); *H04J 1/00* (2013.01); *H04J 3/1694* (2013.01); *H04J 4/00* (2013.01);
(Continued)

(58) Field of Classification Search
CPC .......................... H04W 16/04; H04W 72/044
See application file for complete search history.

(56) References Cited

U.S. PATENT DOCUMENTS

| 8,654,724 B2 * | 2/2014 | Sumasu | ................ H04L 5/0053 370/329 |
| 2010/0309867 A1 * | 12/2010 | Palanki | ................ H04L 5/0053 370/329 |

(Continued)

FOREIGN PATENT DOCUMENTS

| JP | 2011529318 | 12/2011 |
| KR | 10-2012-0026124 | 3/2012 |

(Continued)

OTHER PUBLICATIONS

PCT International Application No. PCT/KR2014/002891, Written Opinion of the International Searching Authority dated Jul. 14, 2014, 1 page.

(Continued)

*Primary Examiner* — Redentor Pasia
(74) *Attorney, Agent, or Firm* — Lee, Hong, Degerman, Kang & Waimey

(57) ABSTRACT

Provided are a method and an apparatus for allocating radio resources to multiple sites which use the same frequency band. The method comprises: determining a resource allocation unit being used in common in the multiple sites; and allocating resources to the multiple sites on the basis of the resource allocation unit, wherein with respect to the resource (Continued)

allocation unit, radio resources allocated to the respective multiple sites are divided and arranged in a time domain.

6 Claims, 18 Drawing Sheets

(51) Int. Cl.
    *H04J 3/16*     (2006.01)
    *H04J 1/00*     (2006.01)
    *H04W 16/04*     (2009.01)
    *H04L 5/14*     (2006.01)
    *H04L 5/00*     (2006.01)

(52) U.S. Cl.
    CPC ............. *H04W 16/04* (2013.01); *H04L 5/001* (2013.01); *H04L 5/0037* (2013.01); *H04L 5/0053* (2013.01); *H04L 5/0055* (2013.01); *H04L 5/1469* (2013.01)

(56) References Cited

U.S. PATENT DOCUMENTS

| | | | | |
|---|---|---|---|---|
| 2010/0309876 A1* | 12/2010 | Khandekar | ........... | H04L 5/0037 370/330 |
| 2011/0075611 A1* | 3/2011 | Choi | ..................... | H04L 1/1819 370/329 |
| 2011/0188481 A1* | 8/2011 | Damnjanovic | ....... | H04W 72/04 370/336 |
| 2012/0076025 A1* | 3/2012 | Barbieri | ................ | H04L 5/0023 370/252 |
| 2013/0114419 A1* | 5/2013 | Chen | ..................... | H04L 5/0053 370/248 |
| 2013/0121316 A1* | 5/2013 | Skov | ..................... | H04L 5/0007 370/336 |
| 2013/0308550 A1* | 11/2013 | Yin | ......................... | H04L 5/001 370/329 |
| 2014/0071934 A1* | 3/2014 | Frenne | .................... | H04L 5/001 370/330 |
| 2014/0362743 A1 | 12/2014 | Park et al. | | |

FOREIGN PATENT DOCUMENTS

| | | |
|---|---|---|
| WO | 2010/141913 | 12/2010 |
| WO | 2012/047634 | 4/2012 |
| WO | 2012099389 | 7/2012 |
| WO | 2012/158959 | 11/2012 |
| WO | 2014117358 A1 | 8/2014 |

OTHER PUBLICATIONS

Japan Patent Office Application Serial No. 2016-505415, Office Action dated Dec. 2, 2016, 3 pages.

LG Electronics, "Enhancement to Time-domain Resource Partitioning", R1-122289, 3GPP TSG RAN WG1 Meeting #69, May 2012, 2 pages.

Pantech, "Discussions on different network configurations in eICIC", R1-112282, 3GPP TSG RAN WG1 Meeting #66, Aug. 2011, 5 pages.

European Patent Office Application No. 14778848.3, Search Report dated Oct. 12, 2016, 6 pages.

\* cited by examiner

METHOD AND APPARATUS FOR ALLOCATING RESOURCES TO MULTIPLE SITES WHICH USE SAME FREQUENCY BAND

CROSS-REFERENCE TO RELATED APPLICATIONS

This application is the National Stage filing under 35 U.S.C. 371 of International Application No. PCT/KR2014/002891, filed on Apr. 3, 2014, which claims the benefit of U.S. Provisional Application No. 61/808,186, filed on Apr. 3, 2013, the contents of which are all hereby incorporated by reference herein in their entirety.

BACKGROUND OF THE INVENTION

Field of the Invention

The present invention relates to a wireless communication system and more particularly, a method and an apparatus for allocating resources to multiple sites which use the same frequency band.

Related Art

The next-generation wireless communication system is being designed to support various services and system configurations such as Machine Type Communication (MTC), Multi User-Multi Input Multi Output (MU-MIMO), carrier aggregation of component carriers utilizing different Uplink-Downlink (UL-DL) configurations, and aggregation of heterogeneous cells. Aggregation of heterogeneous cells includes aggregation of legacy cells and New Carrier Type (NCT) cells; aggregation of macro-cells and small cells; and aggregation of cells utilizing Frequency Division Duplex (FDD) frames and cells utilizing Time Division Duplex (TDD) frames.

The system configuration above can include not only the aggregation of cells located in the same site but also aggregation of cells belonging to different sites. In the latter case, a delay can be generated in transmitting control information between sites, and thus, scheduling can be carried out separately from each other.

In case multiple sites use carrier waves of the same frequency and carry out scheduling independently from each other, resources scheduled separately for individual sites may collide with each other.

As described above, in case multiple sites use carrier waves of the same frequency, resource allocation for each site has to be planned with significant caution.

SUMMARY OF THE INVENTION

The present invention has been made in an effort to provide a method and an apparatus for allocating resources without causing collision among resources scheduled for multiple sites using the same frequency band.

In one aspect, provided is a method for allocating radio resources to multiple sites using the same frequency band. The method includes determining a resource allocation unit used commonly among the multiple sites and allocating resources to the multiple sites on the basis of the resource allocation unit. The resource allocation unit is used such that radio resources allocated to each of the multiple sites are distributed being separated in the time domain.

In another aspect, provided is an apparatus for allocating radio resources to multiple sites using the same frequency band. The apparatus includes a Radio Frequency (RF) unit configured to transmit and receive radio signals and a processor connected to the RF unit. The processor is configured to determine a resource allocation unit used commonly among the multiple sites and to allocate resources to the multiple sites on the basis of the radio allocation unit. The resource allocation unit is used such that radio resources allocated to each of the multiple sites are distributed being separated in the time domain.

The present invention can allocate resources among multiple sites using the same frequency band without a risk of resource collision. In this case, each of the multiple sites uses a resource allocation unit which is configured on the basis of the HARQ period of the corresponding site. Therefore, resources can be allocated to each of the multiple sites without significantly changing the HARQ defined when the corresponding site is scheduled separately.

DESCRIPTION OF EXEMPLARY EMBODIMENTS

User Equipment (UE) can be fixed or can have mobility. UE can also be called another term, such as a Mobile Station (MS), a Mobile Terminal (MT), a User Terminal (UT), a Subscriber Station (SS), a wireless device, a Personal Digital Assistant (PDA), a wireless modem, or a handheld device.

The BS commonly refers to a fixed station that communicates with UE. The BS can also be called another tem, such as an evolved-NodeB (eNodeB), a Base Transceiver System (BTS), or an access point.

Communication from a BS to UE is called downlink (DL), and communication from UE to a BS is called uplink (UL). A wireless communication system including a BS and UE can be a Time Division Duplex (TDD) system or a Frequency Division Duplex (FDD) system. A TDD system is a wireless communication system that performs UL and DL transmission/reception using different times in the same frequency band. An FDD system is a wireless communication system that enables UL and DL transmission/reception at the same time using different frequency bands. A wireless communication system can perform communication using radio frames.

Figure 1:
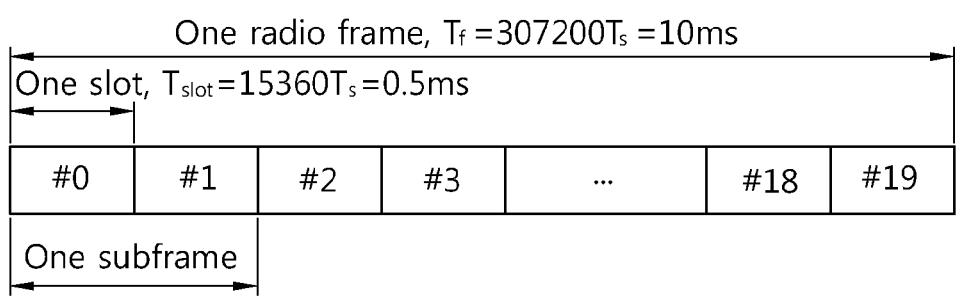
FIG. 1 shows the structure of an FDD radio frame.

FIG. 1 shows the structure of an FDD radio frame.

An FDD radio frame (in what follows, it is called an FDD frame for short) consists of 10 subframes, and one subframe comprises two consecutive slots. Slots included in an FDD frame can be indexed with 0 to 19. The time interval required for one subframe to be transmitted is called a transmission time interval (TTI), and the TTI can be used as a minimum scheduling unit. For example, length of one subframe can be 1 ms, and length of one slot can be 0.5 ms. If length of a radio frame is denoted by $T_f$, $T_f$ can be 307200 $T_s$, which is equal to 10 ms.

In the FDD frame, downlink subframes and uplink subframes can be placed in a consecutive manner in the respective frequency bands. In other words, the FDD frame includes 10 downlink subframes in a first frequency band and 10 uplink subframes in a second frequency band. Downlink subframes and uplink subframes within the FDD frame can be indexed sequentially from 0 to 9.

Figure 2:
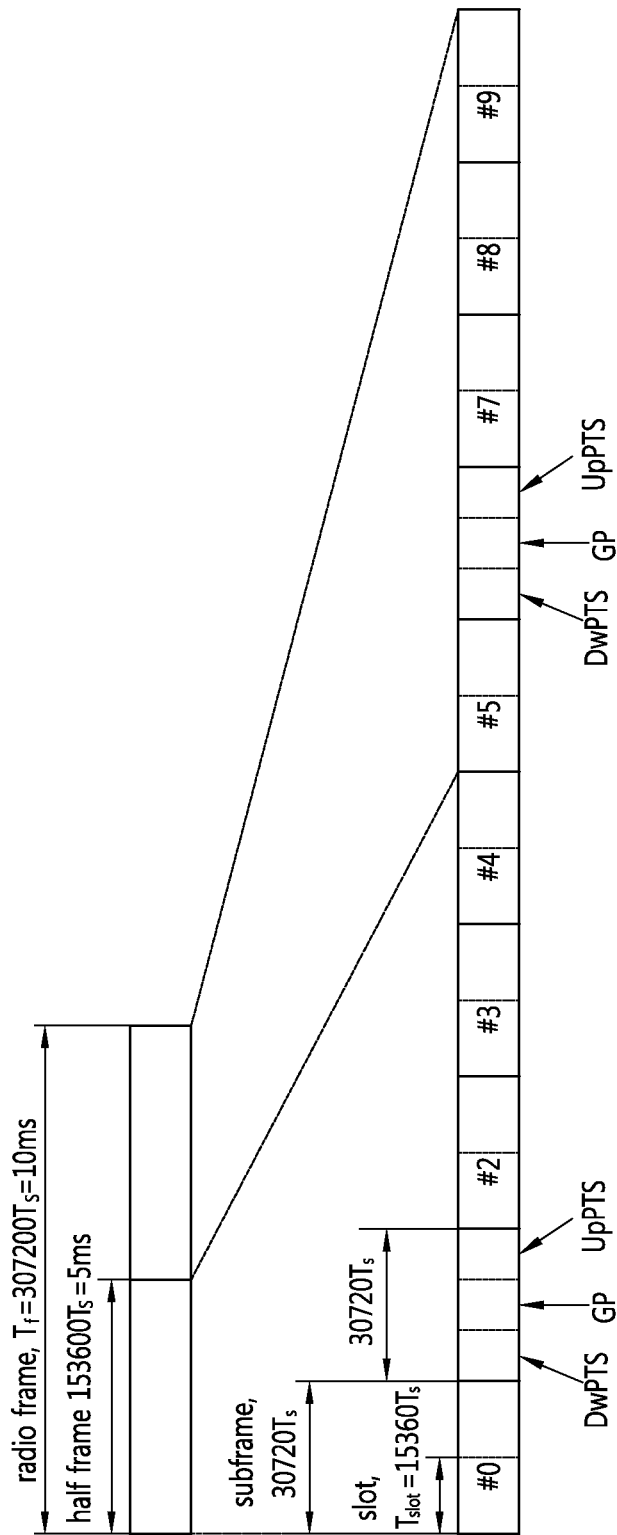
FIG. 2 shows the structure of a TDD radio frame.

FIG. 2 illustrates a structure of a TDD radio frame.

With reference to FIG. 2, a TDD radio frame (in what follows, it is called a TDD frame) comprises two half-frames, and one half-frame comprises 5 subframes, thereby comprising a total of 10 subframes. A TDD frame includes a uplink (UL) subframe, a downlink (DL) subframe, and a special (S) subframe within the same frequency band. If subframes of a TDD frame are indexed from 0, subframes indexed with #1 and #6 may correspond to special subframes, where a special subframe includes a downlink pilot time slot (DwPTS), a guard period (GP), and a uplink pilot time slot (UpPTS). The DwPTS is used for an intimal cell search, synchronization, or channel estimation in a user equipment; and can be used for downlink transmission. The UpPTS is used for channel estimation in a base station and uplink transmission synchronization of a user equipment, which can be used for uplink transmission. The GP is a time period defined for removing interference generated in a uplink due to multi-path delay of a downlink signal between the uplink and a downlink. The GP and the UpPTS can be used as a time gap.

As described above, a DL subframe and a UL subframe of a TDD frame coexist in the same frequency band. Table 1 shows one example of UL-DL configuration of a TDD frame.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |

TABLE 1-continued

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, 'D' represents a DL subframe, 'U' a UL subframe, and 'S' a special subframe. Receiving UL-DL configuration from a base station, a user equipment can determine whether individual subframes in a TDD frame correspond to DL subframes (or S subframes) or UL subframes.

Figure 3:
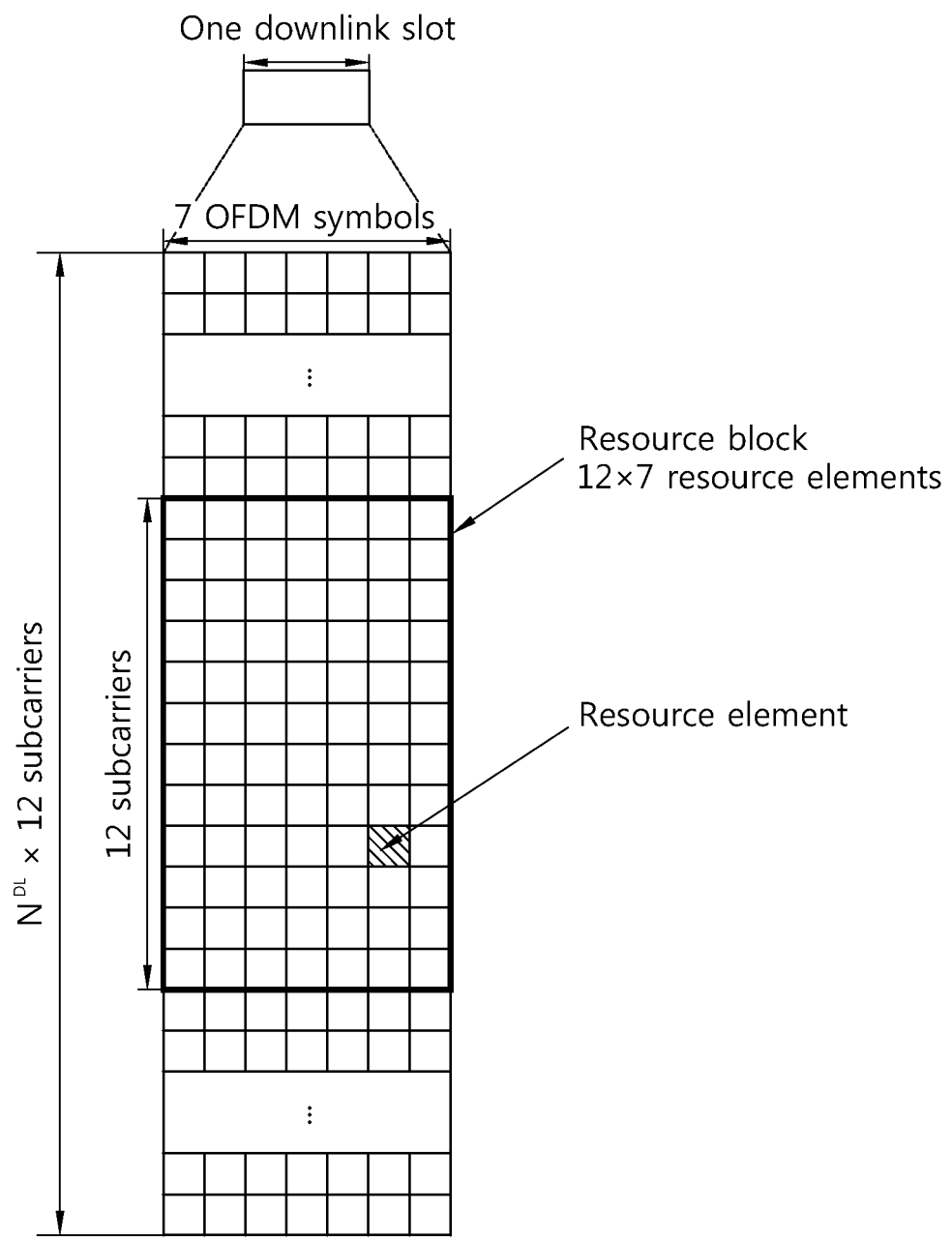
FIG. 3 shows an example of a resource grid for one downlink slot.

FIG. 3 shows an example of a resource grid for one downlink slot.

Referring to FIG. 3, the downlink slot includes a plurality of Orthogonal Frequency Division Multiplexing (OFDM) symbol in the time domain and includes $N_{RB}$ Resource Blocks (RBs) in the frequency domain. The RBs includes one slot in the time domain and a plurality of consecutive subcarrier in the frequency domain in a resource allocation unit. The number of RBs $N_{RB}$ included in the downlink slot depends on a downlink transmission bandwidth $N^{DL}$ configured in a cell. For example, in an LTE system, the $N_{RB}$ can be any one of 6 to 110. An uplink slot can have the same structure as the downlink slot.

Each element on the resource grid is called a Resource Element (RE). The RE on the resource grid can be identified by an index pair (k,l) within a slot. Here, k (k=0, . . . , $N_{RB} \times 12-1$) is a subcarrier index within the frequency domain, and l (l=0, . . . , 6) is an OFDM symbol index within the time domain.

Although 7×12 REs including 7 OFDM symbols in the time domain and 12 subcarrier in the frequency domain have been illustrated as being included in one RB in FIG. 3, the number of OFDM symbols and the number of subcarriers within an RB are not limited thereto. The number of OFDM symbols and the number of subcarriers can be changed in various ways depending on the length of a CP, frequency spacing, etc. In one OFDM symbol, one of 128, 256, 512, 1024, 1536, and 2048 can be selected and used as the number of subcarriers.

Figure 4:
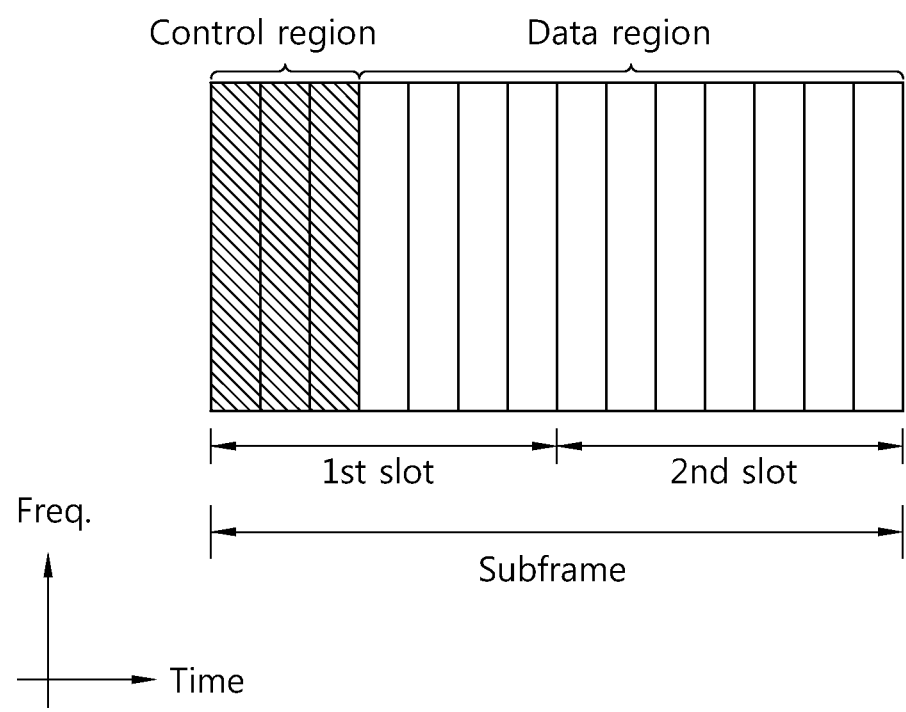
FIG. 4 shows the structure of a DL subframe.

FIG. 4 shows the structure of a DL subframe.

Referring to FIG. 4, a downlink (DL) subframe is divided into a control region and a data region in the time domain. The control region includes a maximum of former 3 (maximum 4 according to circumstances) OFDM symbols of a first slot within a subframe, but the number of OFDM symbols included in the control region can be changed. A control channel different from a physical downlink control channel (PDCCH) is allocated to the control region, and a physical downlink shared channel (PDSCH) is allocated to the data region.

A PCFICH that is transmitted in the first OFDM symbol of a subframe carries a Control Format Indicator (CFI) regarding the number of OFDM symbols (i.e., the size of a control region) that are used to send control channels within the subframe. UE first receives a CFI on a PCFICH and then monitors PDCCHs. Unlike in a PDCCH, a PCFICH is not subject to blind decoding, but is transmitted through the fixed PCFICH resources of a subframe.

A PHICH carries a positive-acknowledgement (ACK)/negative-acknowledgement (NACK) signal for an uplink Hybrid Automatic Repeat reQuest (HARQ). An ACK/NACK signal for uplink (UL) data on a PUSCH which is transmitted by UE is transmitted on a PHICH.

Control information transmitted through a PDCCH is called Downlink Control Information (DCI). DCI can include the resource allocation of a PDSCH (this is also called a DL grant), the resource allocation of a PUSCH (this is also called an UL grant), a set of transmit power control commands for individual MSs within a specific UE group and/or the activation of a Voice over Internet Protocol (VoIP).

Downlink Control Information (DCI) including a DL grant can include a HARQ process number. The DCI has 3 bits for the HARQ process number in the case of FDD, while 4 bits in the case of TDD. The UE can differentiate HARQ processes based on the HARQ process number.

The base station determines a PDCCH format according to the DCI to be sent to the UE, attaches a Cyclic Redundancy Check (CRC) to the DCI, and masks the CRC with a unique identifier (which is called a Radio Network Temporary Identifier (RNTI)) depending on the owner or intended use of the PDCCH.

In case the PDCCH is used for a specific UE, a unique identifier of the UE, for example, the CRC can be masked with a Cell-RNTI (C-RNTI). Similarly, in case the PDCCH is used for a paging message, the CRC can be masked with a paging identifier, for example, a Paging-RNTI (P-RNTI). In the case of a PDCCH for system information, the CRC can be masked with system information identifier, namely, system information-RNTI (SI-RNTI). In order to indicate a random access response, which is a response to a random access preamble of the UE, the CRC can be masked with the Random Access RNTI (RA-RNTI). If the C-RNTI is used, the PDCCH carries control information for the corresponding specific UE (which is called UE-specific control information); if a different RNTI is used, the PDCCH carries common control information that is received by all or a plurality of the UEs within the cell.

The base station encodes CRC-added DCI and generates coded data. The encoding includes channel coding and rate matching. Afterwards, the base station modulates coded data, generates modulated symbols, and transmits the modulated symbols by mapping them into physical resource elements (REs).

The PDSCH transmitted in the data region is a downlink data channel. System information, data, and so on can be transmitted through the PDSCH. And the PBCH carries system information essential for the UE to communicate with the base station, where the system information transmitted through the PBCH is called a Master Information Block (MIB). Similarly, the system information transmitted on the PDSCH specified by the PDCCH is called a System Information Block (SIB).

Figure 5:
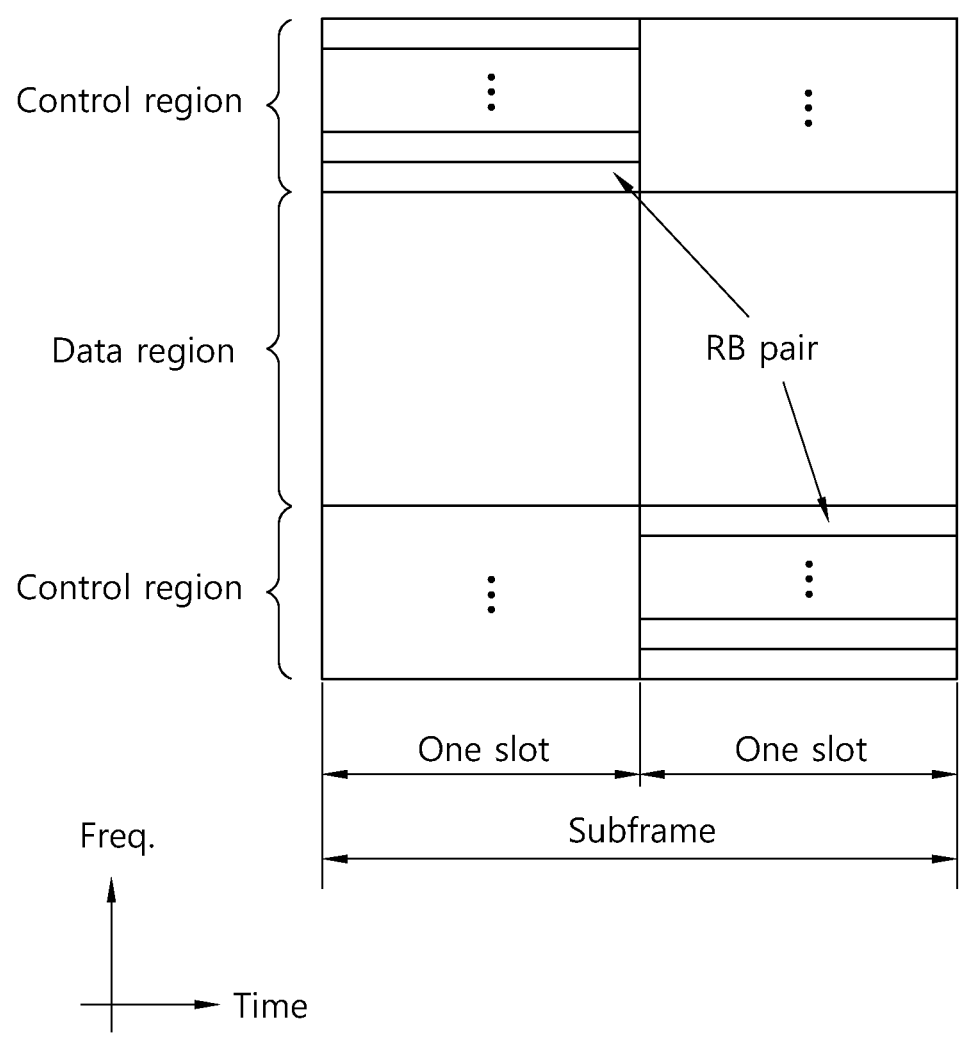
FIG. 5 shows the structure of an UL subframe.

FIG. 5 illustrates a structure of a uplink subframe.

With reference to FIG. 5, in the frequency domain, a uplink subframe can be divided into a control region where a Physical Uplink Control Channel (PUCCH) carrying uplink control information is allocated and a data region where a Physical Uplink Shared Channel (PUSCH) carrying user data and/or control information is allocated.

The PUCCH is allocated onto an RB pair in a subframe. RBs belonging to an RB pair occupy different sub-carriers in each of a first and a second slot.

<Hybrid Automatic Repeat Request (HARQ)>

HARQ operations can be classified into synchronous and asynchronous HARQ.

In a synchronous HARQ scheme, when an initial transmission fails, subsequent retransmission is carried out at a predetermined timing. The retransmission timing can be carried out at each $8^{th}$ time unit (subframe) after the initial transmission. Since that timing is already agreed upon between the base station and the UE, there is no need to additionally inform of the timing. If a data transmitter has received a NACK message, data can be retransmitted at each 8-th subframe until the data transmitter receives an ACK message.

On the other hand, the asynchronous HARQ scheme can be carried out as a retransmission timing is newly scheduled or through additional signaling. The timing of retransmission of the data that were once failed for transmission can be varied by various factors such as a channel condition.

Meanwhile, HARQ operations can be classified into channel non-adaptive HARQ and channel-adaptive HARQ. In the channel non-adaptive HARQ scheme, data modulation, the number of resource blocks, and coding method for retransmission are determined according to the configuration at the initial transmission. On the other hand, in the channel adaptive HARQ scheme, the configuration changes according to the channel condition. For example, suppose a transmitter has transmitted data by using 6 resource blocks at the initial transmission. Then the same number of resource blocks is used to retransmit the data in the channel non-adaptive HARQ scheme. However, in the case of the channel adaptive HARQ scheme, even with the same assumption that 6 resource blocks have been used for the initial data transmission, resource blocks of which the number is larger or smaller than 6 is used for data retransmission depending on the channel condition.

According to the classification above, four different combinations can be applied for HARQ operations; however, asynchronous and channel adaptive HARQ scheme; and synchronous and channel non-adaptive HARQ scheme are two commonly used schemes. The asynchronous and channel adaptive HARQ scheme can maximize retransmission efficiency by changing the amount of resources used and the retransmission timing adaptively according to the channel condition. However, the asynchronous and channel adaptive HARQ scheme readily increases the overhead, by which the scheme is usually not employed for uplink transmission. On the other hand, the synchronous and channel non-adaptive HARQ scheme predetermines retransmission timing and resource allocation, thus requiring virtually zero overhead; however, if the scheme is used in the channel condition exhibiting a severe change, the retransmission efficiency degrades considerably.

In the current 3GPP LTE system, asynchronous HARQ scheme is used for downlink transmission while synchronous HARQ scheme is used for uplink transmission. In other words, asynchronous HARQ scheme is used when the base station transmits/retransmits data while synchronous HARQ scheme is used when the UE transmits/retransmits data.

Figure 6:
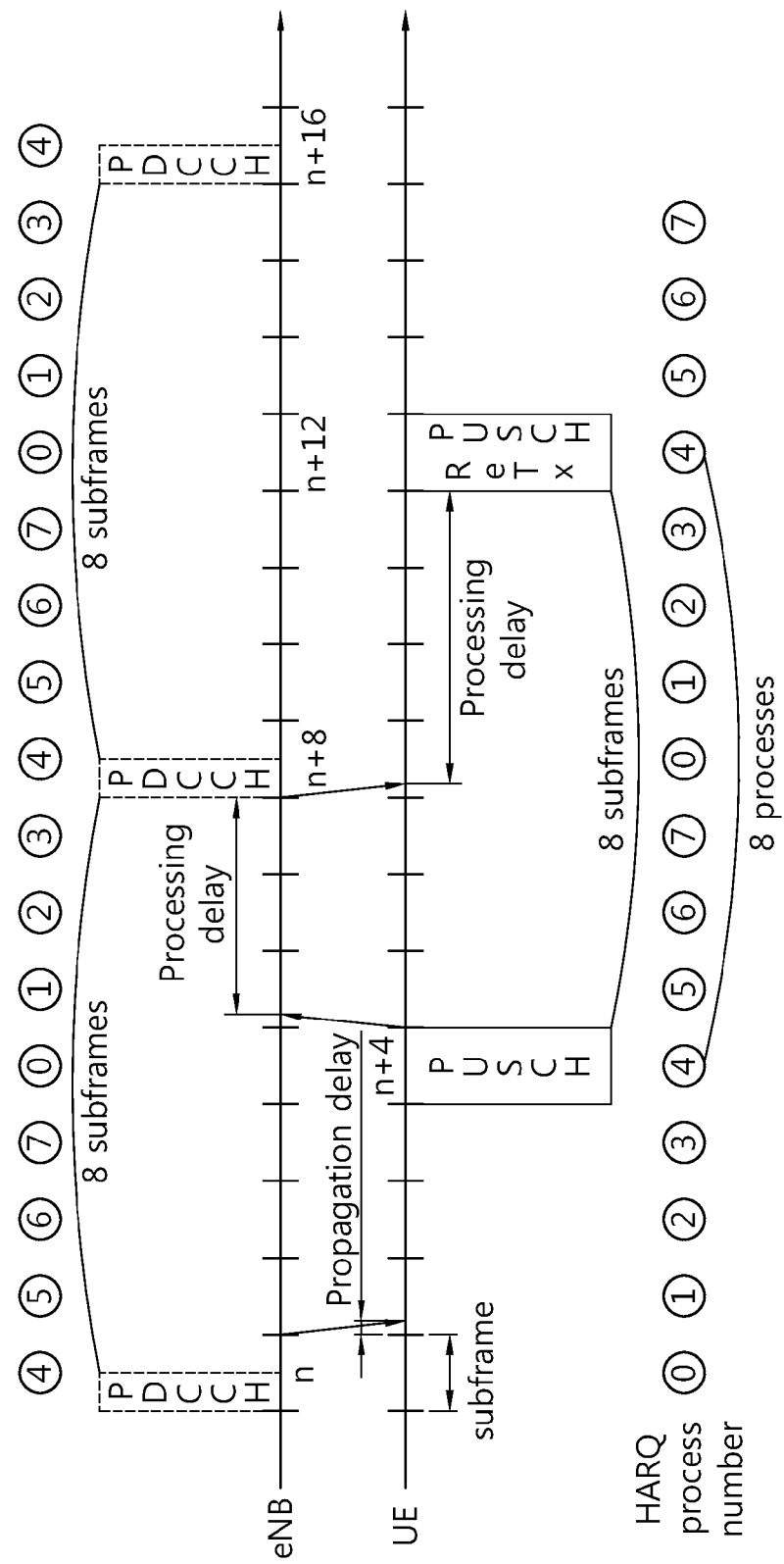
FIG. 6 illustrates a synchronous HARQ scheme used for uplink transmission.

FIG. 6 illustrates a synchronous HARQ scheme used for uplink transmission.

With reference to FIG. 6, after receiving a UL grant, which is scheduling information, at subframe n, the UE transmits the PUSCH at subframe n+4. It should be noted that the PUSCH is scheduled by the UL grant. At subframe n+8, the UE can receive the ACK/NACK signal related to the PUSCH through the PHICH or can receive the UL grant through the PDCCH. The UE can retransmit the PUSCH at subframe n+12. Subframe n, n+4, n+8, and n+12 are the subframes constituting the same HARQ process, and the same HARQ process number can be assigned to the subframes.

Meanwhile, as shown in FIG. 6, a time delay occurs until the UE transmits the next data after receiving the UL grant or the ACK/NACK signal from the base station. The time delay is generated due to a channel propagation delay and processing time required for data decoding and encoding. In order to prevent data transmission from being stopped during the time delay period, a method for transmitting data by using an independent HARQ process is being used.

For example, suppose the shortest time period from data transmission to the next data transmission is 8 subframes for one HARQ process. Then data transmission can be carried out without discontinuity by employing 8 independent HARQ processes. In the LTE FDD scheme, a maximum of 8 HARQ processes can be allocated in case the system is not based on the Multi Input Multi Output (MIMO) operation. In the LTE FDD scheme, the maximum number of HARQ processes can be varied according to UL-DL configuration, which will be described in detail later. In case two codewords are transmitted simultaneously based on the MIMO operation, the two codewords can be transmitted together through one HARQ process, or the two codewords can be transmitted separately by the respective HARQ processes.

In what follows, a carrier aggregation system will be described.

Figure 7:
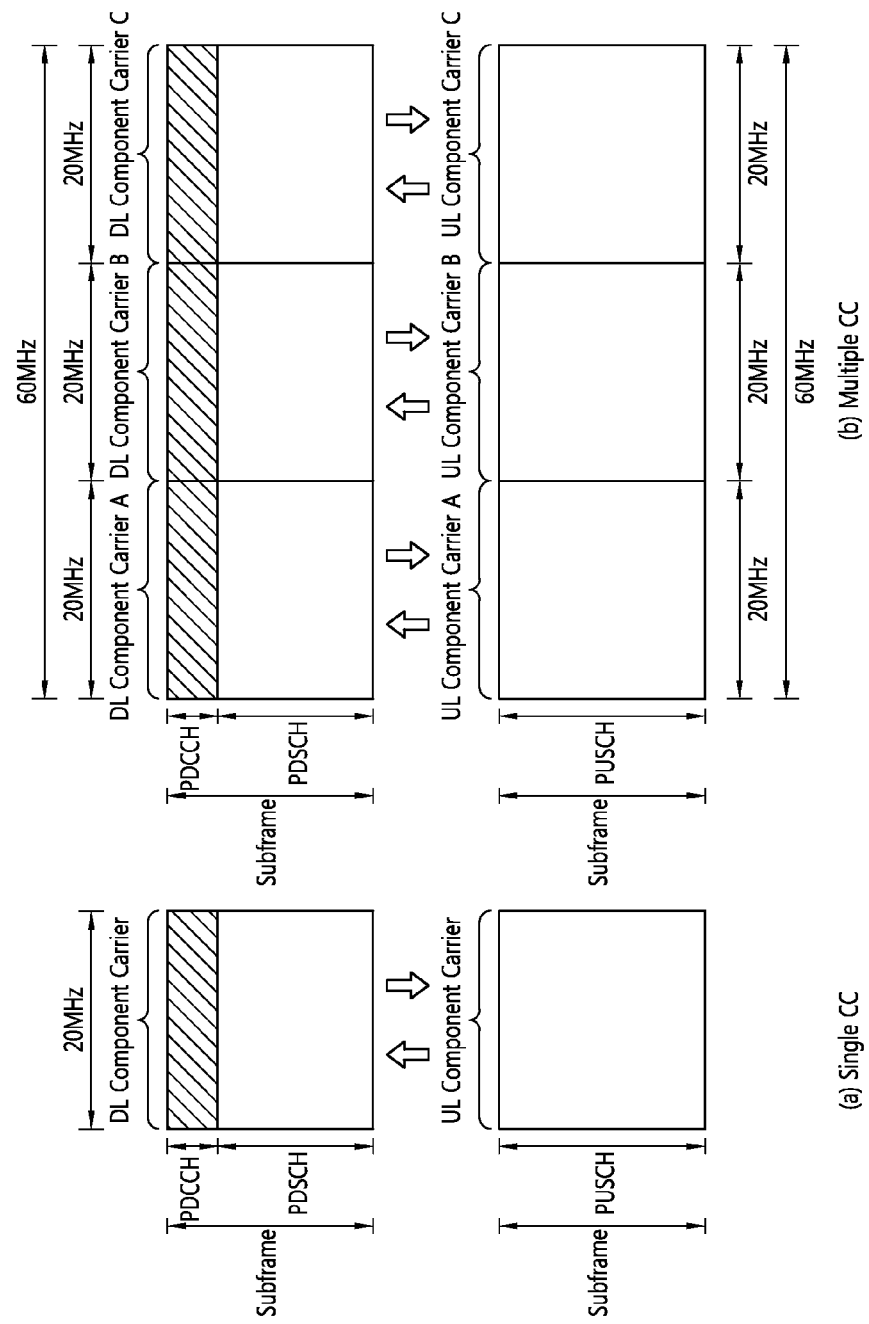
FIG. 7 is an example where a single component carrier system and a carrier aggregation system are compared with each other.

FIG. 7 is an example where a single component carrier system and a carrier aggregation system are compared with each other.

With reference to FIG. 7, in a single component carrier system, only one component carrier is allocated to the UE for uplink and downlink transmission. The bandwidth of a component carrier can vary, but only one component carrier is allocated to the UE. On the other hand, in a carrier aggregation (CA) system, a plurality of component carriers (DL CC A to C, UL CC A to C) can be allocated. For example, three component carriers of 20 MHz bandwidth can be allocated to the UE so that bandwidth of 60 MHz can be allocated.

Carrier aggregation systems can be classified into contiguous carrier aggregation systems where individual component carriers are disposed contiguously and non-contiguous carrier aggregation systems where individual component carriers are disposed apart from each other. In what follows, if a system is simply called a carrier aggregation system, it should be understood that the system refers to both of the case where component carriers are contiguous and the case where component carriers are non-contiguous.

When more than one component carrier is aggregated, target component carriers can use the same bandwidth employed by existing systems to ensure backward compatibility with the existing systems. For example, the 3GPP LTE system supports bandwidth of 1.4 MHz, 3 MHz, 5 MHz, 10 MHz, 15 MHz, and 20 MHz, while the 3GPP LTE-A system is capable of implementing broadband more than 20 MHz by using only the bandwidth of the 3GPP LTE system. Or a broadband system can be implemented by defining new bandwidth instead of adopting the bandwidth of existing systems directly.

System frequency band of a wireless communication system is differentiated by a plurality of carrier frequency. At this time, carrier frequency refers to the center frequency of a cell. In what follows, it is assumed that a cell can be composed of a pair of downlink frequency resources and uplink frequency resources. Or a cell can be composed only of downlink frequency resources. In general, if carrier aggregation is not taken into account, a single cell can always have uplink and downlink frequency resources in the form of a pair.

In order for packet data to be transmitted or received through a specific cell, the UE first needs to complete configuration of the specific cell. At this time, configuration refers to the state where system information required for transmitting and receiving data to and from the corresponding cell has been completed. For example, configuration can include the whole process of receiving common physical layer parameters required for data transmission and reception, MAC layer parameters, or parameters required for particular operations in the RRC layer. A cell which has completed configuration enters a state where the cell can immediately transmit and receive packets once information indicating that packet data can be transmitted is received.

A cell which has completed configuration can stay in the activation or deactivation state. At this time, activation refers to the state where data transmission or reception is being carried out or is in a ready state. The UE can monitor or receive the PDCCH and the PDSCH of an activated cell so that the UE can check the resources (which can be frequency or temporal resources) allocated to the UE.

Deactivation refers to the state where it is not possible to transmit or receive traffic data but measurement or transmission/reception of minimal information is allowed. The UE can receive system information (SI) required for receiving packets from a deactivated cell. On the other hand, the UE does not monitor or receive the PDCCH and the PDSCH of a deactivated cell to check the resources (which can be frequency or temporal resources) allocated to the UE.

Cells can be divided into primary cells (Pcells), secondary cells (Scells), and serving cells.

If the cell is configured for carrier aggregation, the UE establishes only one RRC connection to the network. During the RRC connection establishment/re-establishment/handover process, one cell provides Non-Access Stratum (NAS) mobility information and security input. Such a kind of cell is called a primary cell. In other words, a primary cell refers to the cell in which the UE carries out an initial connection establishment procedure or a connection re-establishment procedure or the cell specified as a primary cell during the handover procedure.

A secondary cell refers to the cell configured to provide additional radio resources after an RRC connection is established through a primary cell.

A serving cell refers to the cell configured to provide a service to the UE, and in case carrier aggregation is not configured or the UE is unable to provide carrier aggregation, the serving cell is composed of primary cells. In case carrier aggregation is configured, a plurality of serving cells can be employed. A plurality of serving cells can be formed by a set of one or more cells from among a primary cell or all of the secondary cells.

A Primary Component Carrier (PCC) refers to the CC corresponding to a primary cell. A PCC is such a kind of CC among various CCs, through which the UE establishes (RRC) connection to the base station during an initial phase. The PCC is a special CC which deals with establishing (RRC) connection for signaling of a plurality of CCs and manages UE context information which carries connection information related to the UE. Also, in case the PCC establishes connection to the UE and enters an RRC connected mode, the PCC always stays in the activation mode. A downlink component carrier corresponding to the primary cell is called a DownLink Primary Component Carrier (DL PCC), and a uplink component carrier corresponding to the primary cell is called a UpLink Primary Component Carrier (UL PCC).

A Secondary Component Carrier (SCC) refers to the CC corresponding to a secondary cell. In other words, an SCC is allocated to the UE in addition to a PCC; an SCC is an extended carrier for allocation of additional resources in addition to a PCC and can be in the activation or the deactivation mode. A downlink component carrier corresponding to a secondary cell is called a DL Secondary CC (DL SCC), and a uplink component carrier corresponding to a secondary cell is called a UL SCC.

As for component carriers constituting a serving cell, a downlink component carrier may constitute one serving cell, and a downlink component carrier and a uplink component carrier may be configured to be connected to each other to form one serving cell. In the prior art, a serving cell is not allowed to be formed by only one uplink component carrier. However, the present invention allows a serving cell to be formed by using only a uplink component carrier.

Activation/deactivation of a component carrier is equivalent to the concept of activation/deactivation of a serving cell. For example, suppose a serving cell 1 is composed of a DL CC1. Then activation of the serving cell 1 indicates activation of the DL CC1. Now, suppose a serving cell 2 is configured so that connection is established between a DL CC2 and a UL CC2. Then activation of the serving cell 2 indicates activation of the DL CC2 and the UL CC2. In this sense, each component carrier can correspond to a cell.

The number of component carriers aggregated can be set differently for downlink and uplink. The case where the number of downlink CCs is the same as the number of uplink CCs is called symmetric aggregation, while it is called asymmetric aggregation if the numbers are different. Similarly, sizes of CCs (namely, bandwidth) can be different from each other. For example, if 5 CCs are used to form bandwidth of 70 MHz, the bandwidth may be realized by 5 MHz CC (carrier #0), 20 MHz CC (carrier #1), 20 MHz CC (carrier #2), 20 MHz CC (carrier #3), and 5 MHz CC (carrier #4).

As described above, different from single component carrier systems, a carrier aggregation system can support a plurality of serving cells, namely, a plurality of component carriers (CCs).

Meanwhile, a carrier aggregation system can support Cross-Carrier Scheduling (CCS). CCS is such a scheduling method capable of resource allocation of the PDSCH transmitted through another component carrier by using the PDCCH transmitted through a particular component carrier and/or resource allocation of the PUSCH transmitted through another component carrier in addition to a component carrier linked to the particular component carrier by default. In other words, the PDCCH and the PDSCH can be transmitted through different DL CCs, and the PUSCH can be transmitted through a UL CC which is not linked to the DL CC through which the PDCCH including a UL grant has been transmitted, namely, a UL CC belonging to a different cell other than the UL CC constituting the same cell. As described above, a CCS-supporting system needs a carrier indicator that can be used to indicate which PDSCH/PUSCH transmitted through some DL CC/UL CC is being scheduled by the PDCCH. The field including such a carrier indicator is called a Carrier Indication Field (CIF).

A CCS-supporting system can include the CIF in the existing Downlink Control Information (DCI) format. In the CCS-supporting system, for example, in the LTE-A system, the CIF is added to an existing DCI format (namely, the DCI format used in the LTE system); therefore, 3 bits can be extended, and the PDCCH structure can re-use the coding method, the resource allocation method (in other words, resource mapping based on the CCE), and so on used in the existing system.

The base station can configure a set of PDCCH monitoring DL CCs (monitoring CCs). The set of PDCCH monitoring DL CCs comprises part of the whole DL CCs aggregated, and if CCS is determined, the UE carries out PDCCH monitoring/decoding only for the DL CCs included in the set of PDCCH monitoring DL CCs. In other words, only through the DL CC included in the set of PDCCH monitoring DL CCs, does the base station transmits the PDCCH related to the PDSCH/PUSCH to be scheduled. The set of PDCCH monitoring DL CCs can be configured in a UE-specific manner, in a UE group-specific manner, or in a cell-specific manner.

Non-Cross Carrier Scheduling (NCCS) refers to the scheme where scheduling is carried out within the same carrier (cell) and data are received/transmitted according to the scheduling. The NCCS is also called self-scheduling. The NCCS can be regarded as a scheduling method that has been applied to existing UEs for which only a single cell is established.

<HARQ Period and the Number of HARQ Processes>

The time period required for one DL HARQ process (which is called a HARQ process period or simply a HARQ period) is defined as follows. First, initial transmission is defined as the transmission of data by a base station. At this time, the data collectively refer to all kinds of data requiring ACK/NACK responses. For example, the data are not limited to such data as transmission blocks, codewords, and PDSCHs but include control channels requiring ACK/NACK responses, such as DL SPS release PDCCHs.

A user equipment transmits ACK/NACK with respect to the data. After receiving the ACK/NACK that the use equipment has transmitted, a base station may transmit new data according to the ACK/NACK or retransmit data. Even though the base station may transmit new data, for the sake of convenience, retransmission refers to transmitting data in response to the ACK/NACK.

Then the time interval required for the same DL HARQ process can be defined by the difference between the initial transmission and retransmission time. The time interval required for a DL HARQ process may be described by a sum of a time interval before the initial transmission which has become the target of the ACK/NACK (which is denoted by a subframe unit, k) with respect to the UL subframe through which the ACK/NACK is transmitted and a time interval before retransmission since the ACK/NACK (which is denoted by a subframe unit, j).

In the FDD scheme, since the ratio of a DL subframe to a UL subframe is 1-to-1 and DL subframes and UL subframes are located consecutively in different frequency bands within the FDD frame, the time interval for carrying out a DL HARQ process can be fixed as 8 subframes.

On the other hand, since the k and the j above can differ from each other for each UL subframe in the TDD scheme, the time interval for the DL HARQ process is not constant.

Taking into account the propagation delay and processing delay between a base station and a user equipment, ACK/NACK is defined to be transmitted after a predetermined time period $k_{min}$ after data reception. After receiving the ACK/NACK, the base station can retransmit the data after a predetermined time period $k_{min}$. The table below shows the position of the shortest DL subframe which is larger than or equal to $k_{min}$=4 after a UL subframe in each UL-DL configuration.

TABLE 2

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 4 | | | | | 4 | | |
| 3 | | | 4 | 4 | 4 | | | | | |
| 4 | | | 4 | 4 | | | | | | |
| 5 | | | 4 | | | | | | | |
| 6 | | | 4 | 6 | 5 | | | 4 | 7 | |

The values in the table above (for example, '4' in the column of subframe 2 for UL-DL configuration 0) represent the shortest time intervals expressed in subframe units, during which the base station can carry out scheduling on the basis of the ACK/NACK response made by the user equipment with respect to a DL HARQ. Therefore, the sum of a previous transmission timing of the DL HARQ process corresponding to the ACK/NACK in each UL subframe and the next transmission timing of the same DL HARQ process with respect to the ACK/NACK in the corresponding UL subframe becomes the shortest time unit with which the same DL HARQ process can be scheduled.

The initial transmission time and the shortest time period available for retransmission can be represented as follows.

Figure 8:
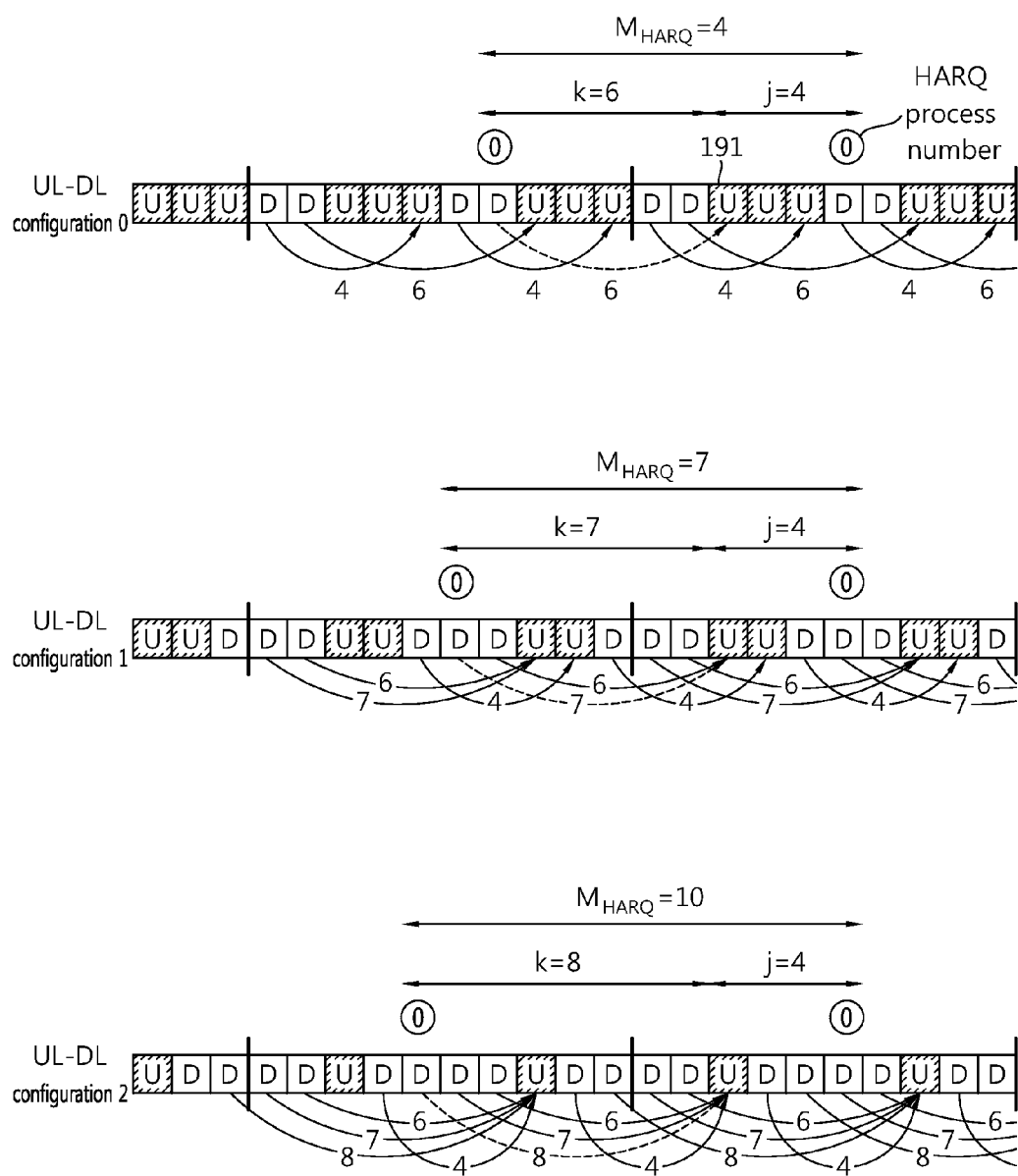
FIG. 8 illustrates an example where the number of DL HARQ processes is determined for each of UL-DL configurations 0 to 2 in one TDD cell.

FIG. 8 illustrates an example where the number of DL HARQ processes is determined for each of UL-DL configurations 0 to 2 in one TDD cell.

For example, in the case of UL-DL configuration 0, k becomes 6, and j becomes 4 with respect to the UL subframe 191. And the number of DL subframes included in the (k+j) subframe intervals is 4. Therefore, $M_{HARQ}$=4.

Figure 9:
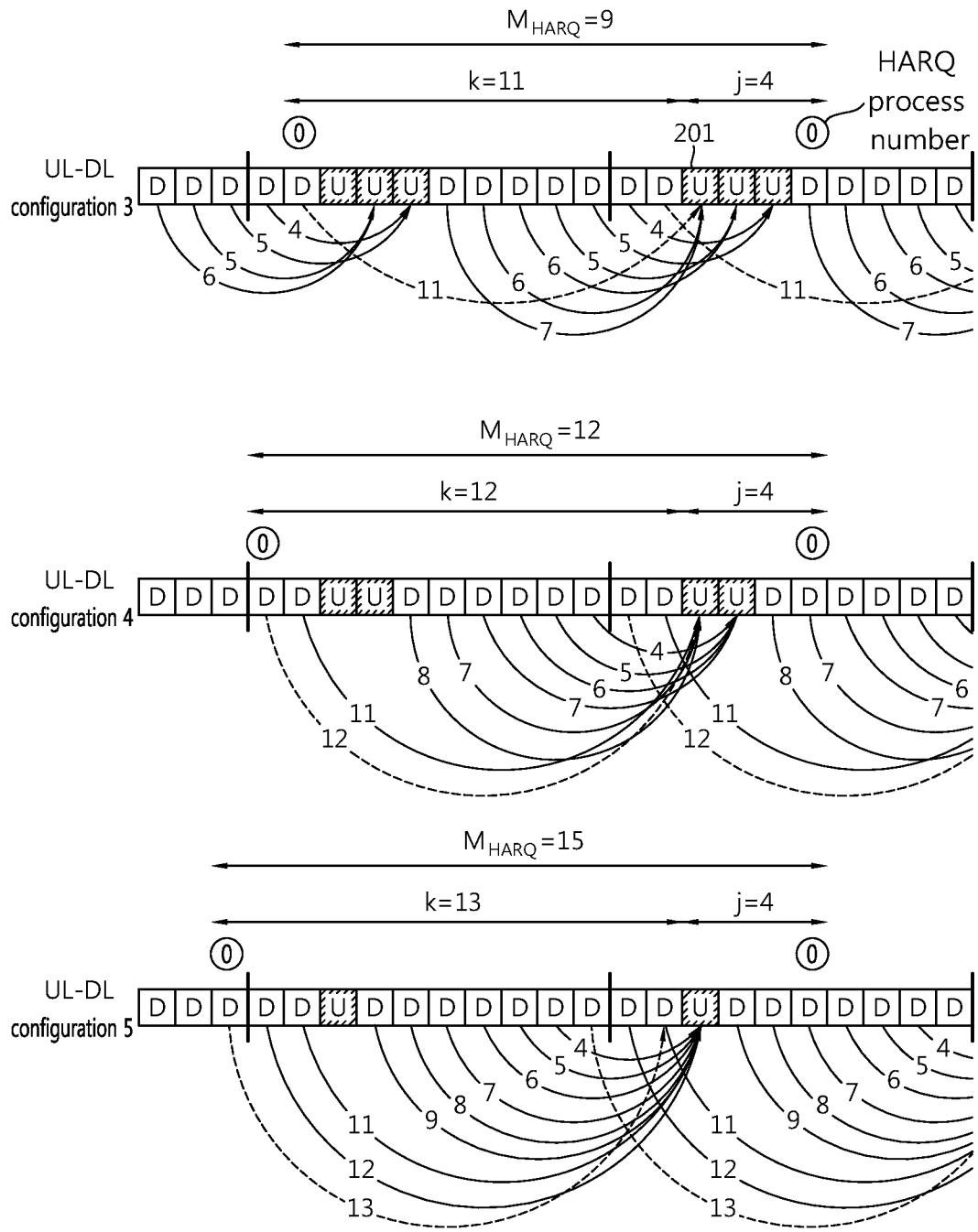
FIG. 9 illustrates an example where the number of DL HARQ processes is determined for each of UL-DL configurations 3 to 5 in one TDD cell.

FIG. 9 illustrates an example where the number of DL HARQ processes is determined for each of UL-DL configurations 3 to 5 in one TDD cell.

For example, in the case of UL-DL configuration 3, k becomes 11, and j becomes 4 with respect to the UL subframe 201. And the number of DL subframes included in the (k+j) subframe intervals is 9. Therefore, $M_{HARQ}$=9.

Figure 10:
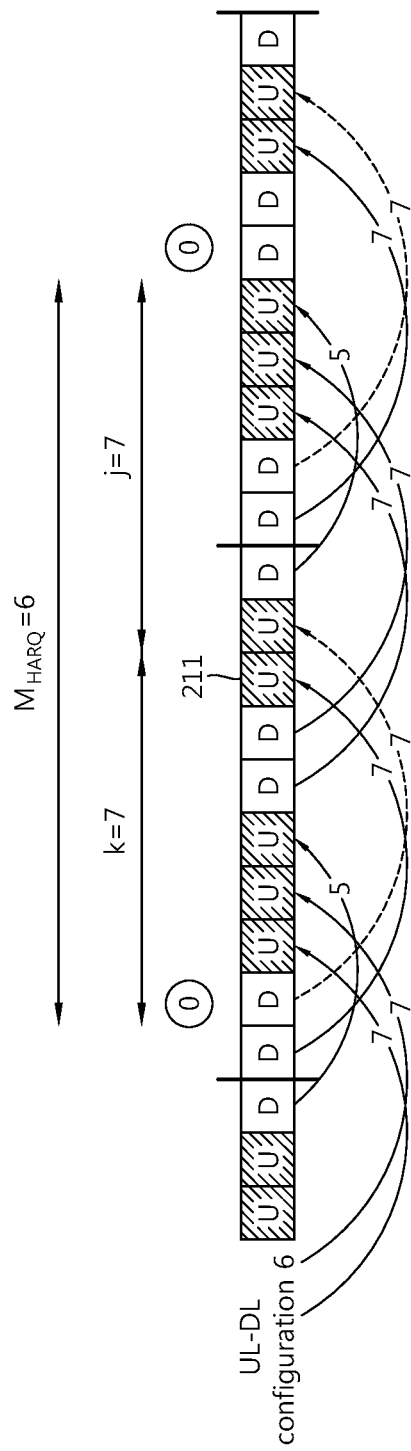
FIG. 10 illustrates an example where the number of DL HARQ processes is determined for each of UL-DL configurations 6 in one TDD cell.

FIG. 10 illustrates an example where the number of DL HARQ processes is determined for each of UL-DL configurations 6 in one TDD cell.

For example, in the case of UL-DL configuration 6, k becomes 7, and j becomes 7 with respect to the UL subframe 211. And the number of DL subframes included in the (k+j) subframe intervals is 6. Therefore, $M_{HARQ}$=6.

In other words, FIGS. 8 to 10 illustrate examples of determining the number of DL HARQ processes with respect to one TDD cell.

To describe synchronization HARQ timing used in the uplink, a few terms are introduced for the sake of convenience. The terms can be used in the descriptions and drawings below.

First, the difference between the transmission time of a UL grant and the initial transmission time of a PUSCH is

TABLE 3

| UL-DL Conf. | Subframe n | | | | | | | | | | Max (HARQ period) | Max DL HARQ |
|---|---|---|---|---|---|---|---|---|---|---|---|---|
| | 0 | 1 | 2 | 3 | 4 | 5 | 6 | 7 | 8 | 9 | | |
| 0 | — | — | {6} + 4 | — | {4} + 6 | — | — | {6} + 4 | — | {4} + 6 | 10 | 4 |
| 1 | — | — | {7, 6} + 4 | {4} + 6 | — | — | — | {7, 6} + 4 | {4} + 6 | — | 11 | 7 |
| 2 | — | — | {8, 7, 4, 6} + 4 | — | — | — | — | {8, 7, 4, 6} + 4 | — | — | 12 | 10 |
| 3 | — | — | {7, 6, 11} + 4 | {6, 5} + 4 | {5, 4} + 4 | — | — | — | — | — | 15 | 9 |
| 4 | — | — | {12, 8, 7, 11} + 4 | {6, 5, 4, 7} + 4 | — | — | — | — | — | — | 16 | 12 |
| 5 | — | — | {13, 12, 9, 8, 7, 5, 4, 11, 6} + 4 | — | — | — | — | — | — | — | 17 | 15 |
| 6 | — | — | {7} + 4 | {7} + 6 | {5} + 5 | — | — | {7} + 4 | {7} + 7 | — | 14 | 6 |

The Table 3 shows (k+j) values in the individual UL subframes within a TDD frame according to the UL-DL configuration. If the k value for a subframe n is denoted by k(n) and the j value for the subframe n is denoted by j(n), Table 3 represents the sum in the form of {k(n)}+j(n) with respect to the subframe n. k(n) may correspond to any of the multiple values.

In Table 3, 'Max(HARQ period)' denotes the maximum {k(n)}+j(n) values obtained from UL subframes for the individual UL-DL configurations. For example, in the UL-DL configuration 4, the maximum value of {k(n)}+j(n) values is 16.

Meanwhile, the number of DL HARQ processes that can be employed in the downlink (which corresponds to 'Max DL HARQ' in the table above) is associated with the maximum value of the k(n)+j(n) value. In other words, the number of DL HARQ processes in one cell can be determined by the number of DL subframes included in the interval corresponding to the maximum k(n)+j(n) value.

denoted by GU and is expressed by k. The difference between the initial transmission time of the PUSCH and the transmission time of a PHICH is denoted by UH and is expressed by j. The difference between the PHICH transmission time and the PUSCH re-transmission time is denoted by HU and is expressed by r. The difference between retransmission of a UL grant and retransmission of a PUSCH is denoted by GU' and is expressed by k'. The difference between transmission of PUSCH and transmission of the next UL grant is denoted by UG.

Figure 11:
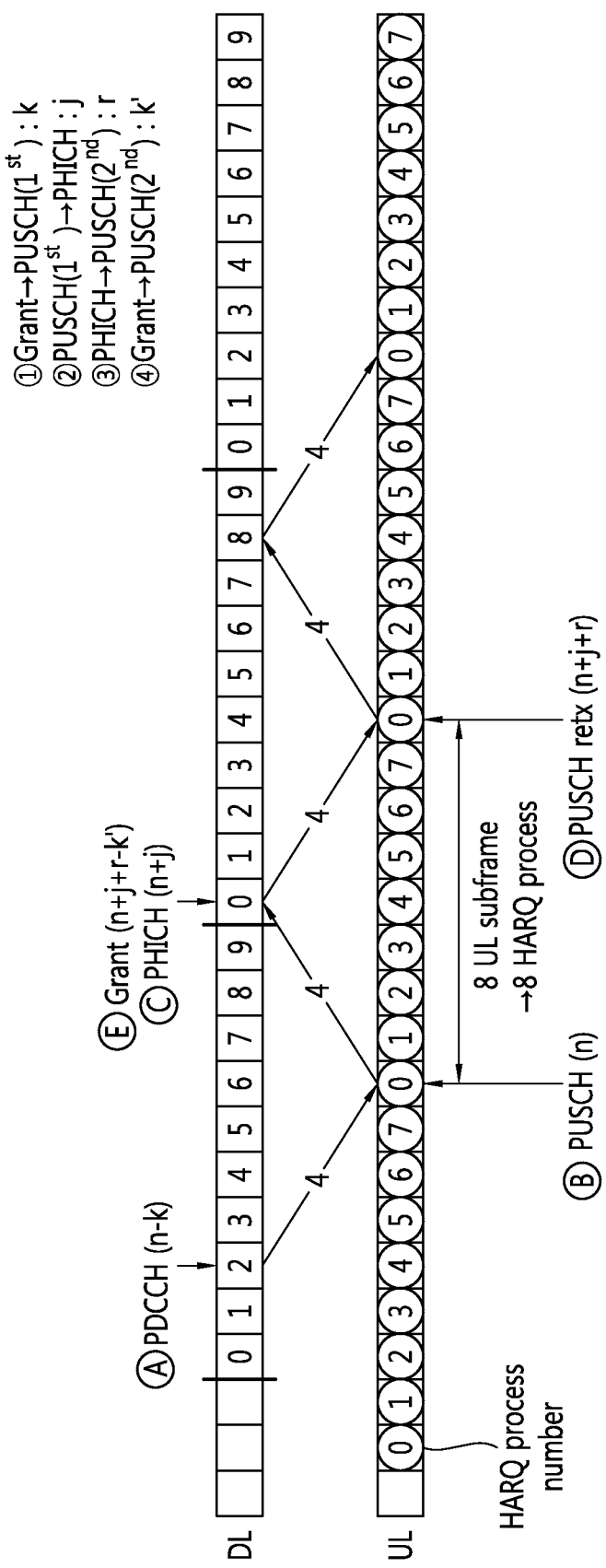
FIG. 11 illustrates synchronized UL HARQ timing when only one FDD cell is used.

FIG. 11 illustrates synchronized UL HARQ timing when only one FDD cell is used.

FIG. 11 shows a downlink subframe n−k to which a UL grant is transmitted by the base station through a PDCCH, a uplink subframe n from which a PUSCH scheduled by the UL grant is transmitted by the user equipment, a downlink subframe n+j to which the ACK/NACK, which is a response of the PUSCH, is transmitted (through a PHICH) by the base station, and a uplink subframe n+j+r from which the PUSCH is retransmitted by the user equipment in case the ACK/

NACK is NACK. Meanwhile, although the user equipment can retransmit a PUSCH on the basis of the ACK/NACK received through the PHICH, the user equipment may retransmit the PUSCH at subframe n+j+r on the basis of the UL grant after receiving the UL grant at subframe n+j+r−k'.

In the FDD frame, DL subframes and UL subframes are located consecutively while always keeping the ratio to be 1-to-1. Therefore, in the synchronized HARQ timing, $k=j=r=k'=k_m=4$. The number of HARQ processes can be determined according to the number of UL subframes included in an interval after transmission of a scheduled PUSCH until retransmission of the PUSCH, and a total of 8 independent HARQ processes can be operated.

Meanwhile, there are not always the same numbers of DL subframes and UL subframes within the TDD frame. Therefore, k, j, r, and k' value which takes into account $k_m=4$ can be changed according to the UL-DL configuration.

Figure 12:
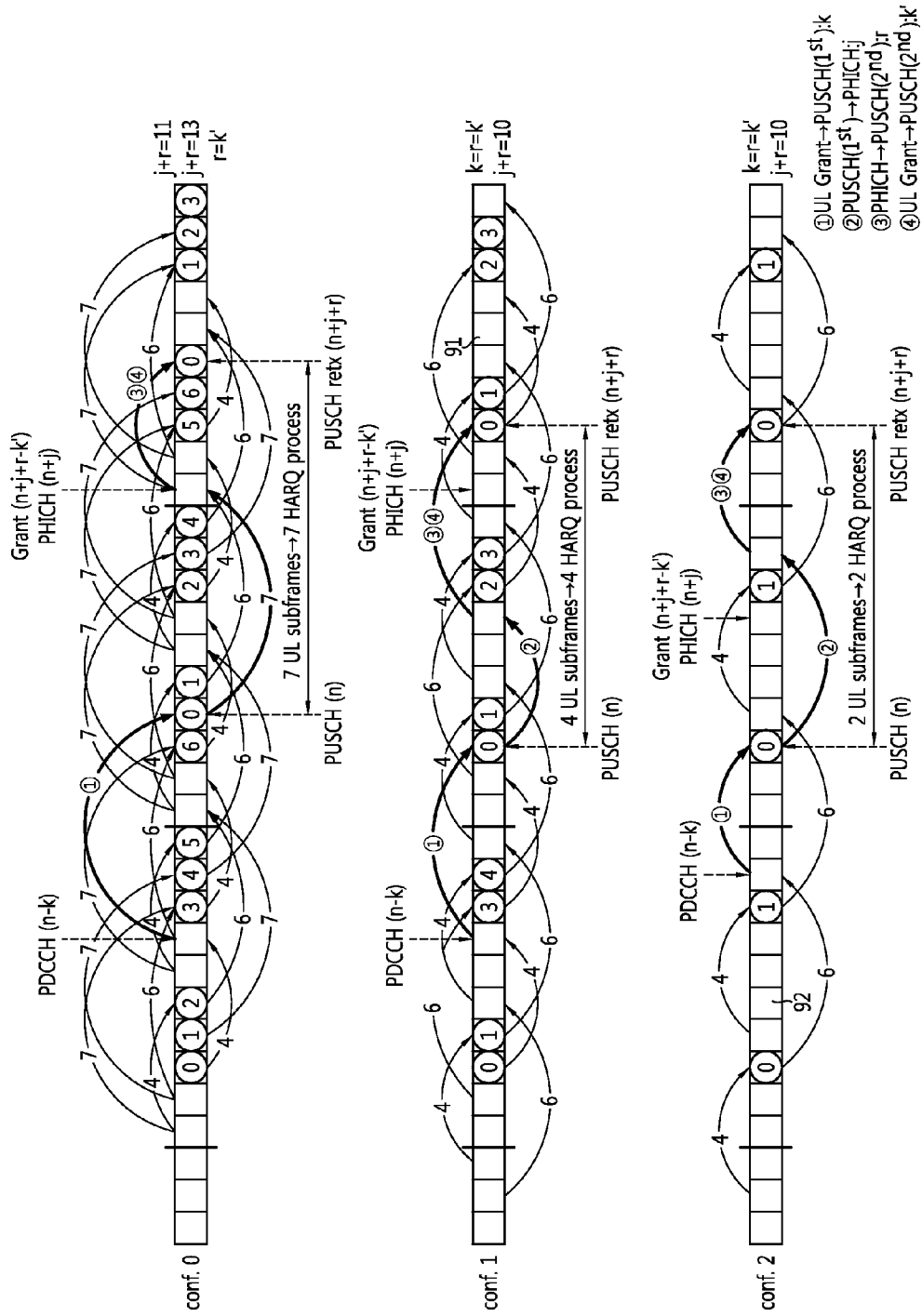
FIGS. 12-13 show legacy synchronized HARQ timing with respect to each of UL-DL configurations in only one TDD cell.
Figure 13:
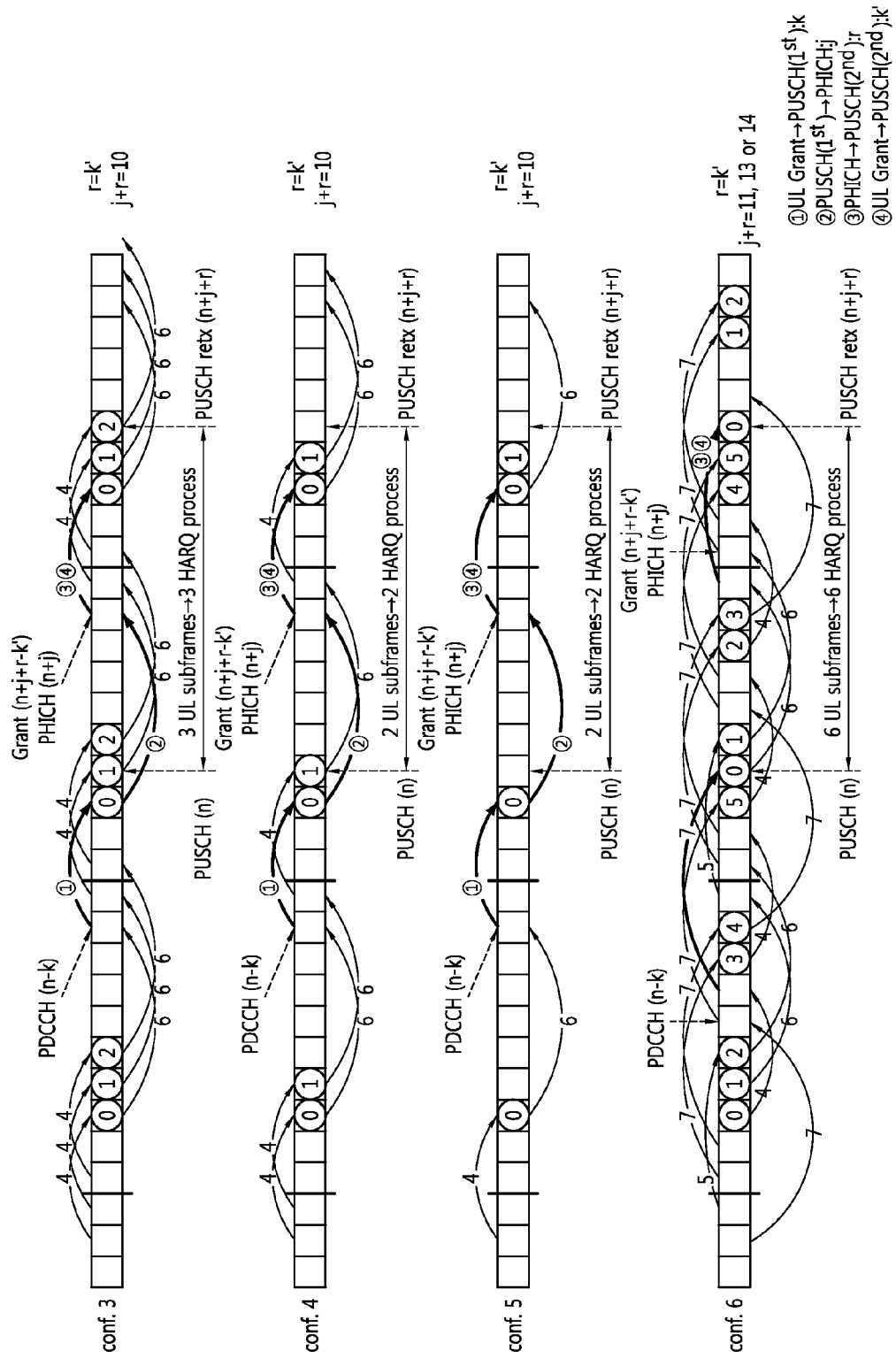

FIGS. 12 and 13 illustrate examples of legacy synchronized UL HARQ timing with respect to each UL-DL configuration in one TDD cell. In other words, FIGS. 12 and 13 show legacy synchronized UL HARQ timing according to the UL-DL configuration when only one TDD cell is used.

FIG. 12 shows legacy synchronized HARQ timing with respect to each of UL-DL configurations 0 to 2. Suppose the user equipment transmits a PUSCH from subframe n. FIG. 12 shows a subframe n−k receiving a PDCCH including a UL grant which schedules the PUSCH, a subframe n+j receiving ACK/NACK with respect to the PUSCH through a PHICH, a subframe n+j+r−k' receiving a UL grant for PUSCH retransmission, and a subframe from which the PUSCH is retransmitted.

FIG. 13 shows a subframe n, subframe n−k, subframe n+j, subframe n+j+r−k', and subframe n+j+r with respect to UL-DL configuration 3 to 6.

In FIGS. 12 and 13, subframes which indicated by numbers are uplink subframes, from each of which a PUSCH can be transmitted. Those subframe which are not indicated by numbers correspond to downlink subframes or special subframes. Also, to downlink subframes connected to the corresponding uplink subframes by arrow marks, a PDCCH including a UL grant or a PHICH including ACK/NACK is transmitted by the base station. Among the DL subframes included in the TDD frame, a downlink subframe not connected to a uplink subframe by an arrow mark corresponds to such a downlink subframe which does not carry a PHICH. In the example of FIG. 12, the downlink subframes 91, 92 are examples of a downlink subframe which does not carry the PHICH.

In what follows, the present invention will be described.

The next-generation wireless communication system is capable of supporting various services and system configurations such as MTC, MU-MIMO, carrier aggregation among component carriers using different UL-DL configurations, aggregation of heterogeneous cells. Aggregation of heterogeneous cells includes aggregation of legacy cells and those cells of New Carrier Type (NCT); aggregation of macro-cells and small cells; and aggregation of cells utilizing Frequency Division Duplex (FDD) frames and cells utilizing Time Division Duplex (FDD) frames.

The system configuration above can include not only the aggregation of cells located in the same site but also aggregation of cells belonging to different sites. In the latter case, a delay can be generated in transmitting control information between sites, and thus, scheduling can be carried out separately from each other.

Different from the legacy technology which limits transmission of the PUCCH to which a uplink control signal is transmitted to a primary cell, the present invention also allows transmission of the PUCCH to a secondary cell. The secondary cell to which the PUCCH is transmitted can be signaled or predetermined.

The number of secondary cells which transmit the PUCCH is one for each cell group. A cell group can be configured through an RRC message.

Meanwhile, In case multiple sites use carrier waves of the same frequency and carry out scheduling independently from each other, resources scheduled separately for individual sites may collide with each other. To avoid collision, resources can be allocated being separated physically from each other through TDM, FDM, CDM, and so on.

In the TDD scheme, the UL/DL subframe to be scheduled in a site A is allocated being separated in the time domain from the UL/DL subframe to be scheduled in a site B.

In what follows, it is assumed that cells located in different sites use carrier waves of the same frequency, and how resources are separately allocated in the TDD scheme will be described.

Figure 14:
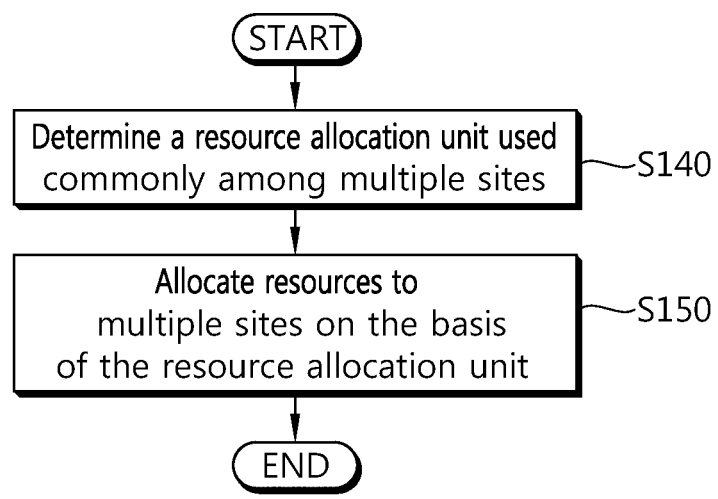
FIG. 14 illustrates a resource allocation method according to one embodiment of the present invention.

FIG. 14 illustrates a resource allocation method according to one embodiment of the present invention.

An apparatus allocating resources to multiple sites determines a resource allocation unit used commonly among the multiple sites S140. The apparatus may be one of the base stations located in the multiple sites or a separate device which manages the base stations. The resource allocation unit can consists of a fixed number of subframes.

The apparatus allocates resources to the multiple sites on the basis of the resource allocation unit S150.

Figure 15:
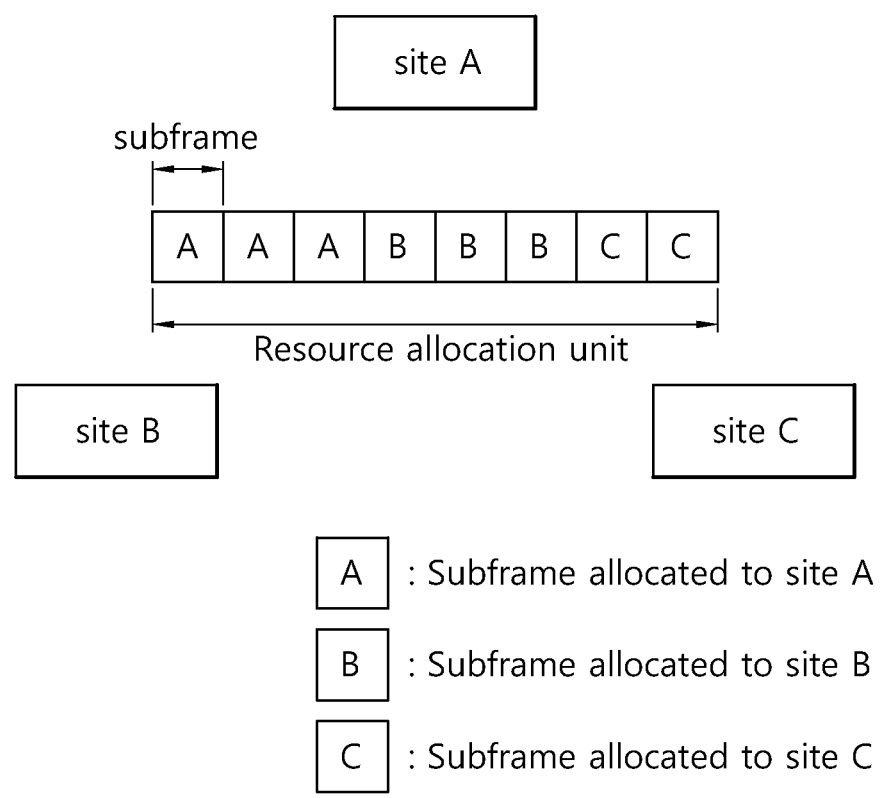
FIG. 15 illustrates one example of allocating radio resources to multiple sites according to the TDM scheme.

FIG. 15 illustrates one example of allocating radio resources to multiple sites according to the TDM scheme.

With reference to FIG. 15, sites A, B, and C are multiple sites using the same frequency band. Each site can have a base station(s) and a user equipment(s).

Resources can be allocated among the sites A, B, and C on the basis of the resource allocation unit. In the resource allocation unit, radio resources allocated to each of the multiple sites can be disposed separately in the time domain, namely, according to the Time Division Multiplexing (TDM) scheme.

In this case, determining efficiently the number of subframes comprising the resource allocation unit can be an issue worthy of consideration. This document describes the HARQ period in each site and a method for configuring the resource allocation unit on the basis of the number of HARQ processes.

In what follows, a method for allocating resources to multiple sites on the basis of a resource allocation unit will be described with respect to the individual cases where each site uses the FDD system and where each site uses the TDD system.

<TDM According to HARQ Process Timing in the FDD System>

In the LTE system, HARQ is applied to the data channel for the efficiency of transmission. In the case of downlink transmission, ACK/NACK which indicates normal reception of a data channel (PDSCH) is obtained through the PUCCH as a feedback signal. At this time, taking into account the propagation delay and processing delay between the base station and the user equipment, it is specified such that the ACK/NACK is transmitted after a predetermined time period $k_{min}$ from data transmission time. The base station can retransmit data after a predetermined time period $k_{min}$ after receiving the ACK/NACK.

In the FDD system, a maximum of 8 HARQ processes can be set up simultaneously. In the case of a uplink, too, the HARQ process is carried out in the order of reception of a uplink grant, transmission of the PUSCH, reception of the ACK/NACK through the PHICH or reception of the uplink grant; and a maximum of 8 HARQ processes can be carried out.

To efficiently operate the HARQ set up as described above, it is preferable to apply the TDM method according to the HARQ period. In other words, since 8 subframes (8 ms) form the HARQ period in the FDD system, 8 subframes can be divided according to the TDM scheme. In other words, the resource allocation unit can comprise 8 subframes. Within the resource allocation unit, the subframes allocated to each site are divided according to the TDM scheme. In other words, the number of subframes included in the resource allocation unit can be determined on the basis of the HARQ period in each of the multiple sites.

Figure 16:
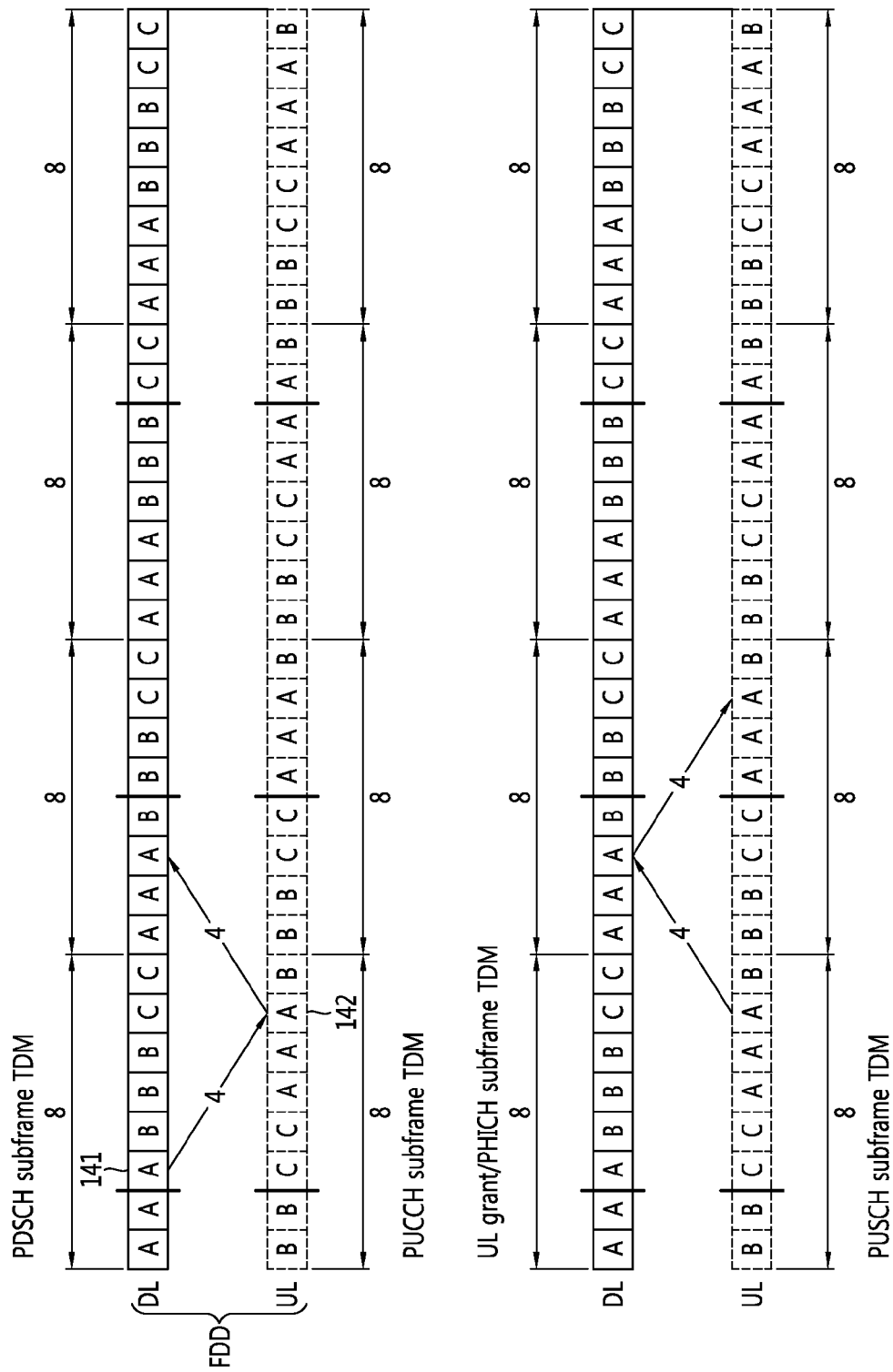
FIG. 16 illustrates an example of allocating resources according to the TDM scheme to 3 sites operating based on the FDD scheme.

FIG. 16 illustrates an example of allocating resources according to the TDM scheme to 3 sites operating based on the FDD scheme.

Suppose the three sites are site A, B, and C.

With reference to FIG. 16, 8 consecutive subframes become the resource allocation unit for downlink carriers. From among the 8 consecutive subframes, 3 subframes can be allocated to the site A, 3 subframes to the site B, and 2 subframes to the site C.

Also, 8 consecutive subframes become the resource allocation unit for uplink carriers. From among the 8 consecutive subframes, 3 subframes can be allocated to the site A, 3 subframes to the site B, and 2 subframes to the site C.

Meanwhile, according to division of a downlink subframe which transmits the PDSCH, division of a uplink subframe which transmits the PUCCH can be determined. Similarly, according to division of a uplink subframe transmitting the PUCCH, division of a downlink subframe transmitting the PDSCH may be determined.

In other words, among subframes allocated to the same site from a downlink and a uplink carrier, at least one pair of subframes are allocated being separated by more than $k_{min}$ in the time domain. For example, the subframe 141 allocated to site A from a downlink carrier and the subframe 142 allocated to the site A from a uplink carrier are separated by $k_{min}$ (=4 subframes) from each other.

Subframes allocated to each site can be specified through a bitmap. For example, an 8-bit bitmap can be used to specify subframes allocated to each site.

According to the method above, the ACK/NACK transmission timing intended for an legacy, single site can be used in the same way for multiple sites. In particular, in the case of a uplink HARQ process operating in a synchronous manner, the ACK/NACK transmission timing can be applied by minimizing a retransmission period of the HARQ without change of HARQ timing.

In the downlink, however, since the period of a synchronous HARQ process is not clearly defined, a frame period rather than that based on the HARQ process can be employed. In the uplink case, the ACK/NACK transmission timing can be configured on the basis of the HARQ process.

In the method above, the HARQ period has been used, but a correspondence relationship between a HARQ process number and subframe has not been defined. In case the HARQ period does not coincide with a subframe number within the frame, alignment of a frame with the subframe which is time-division multiplexed at the HARQ period may be needed.

To this purpose, subframe mapping can be carried out by using System Frame Number (SFN) as a parameter.

Figure 17:
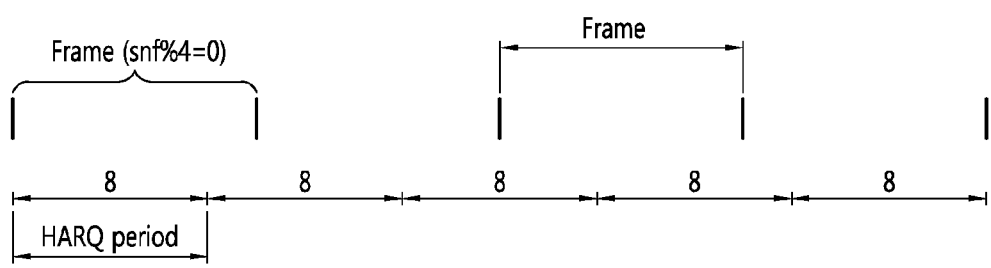
FIG. 17 is one example of mapping which takes into account a system frame number and a HARQ period.

FIG. 17 is one example of mapping which takes into account a system frame number and a HARQ period.

In the FDD system, since the least common multiple of the HARQ period (=8 subframe) and the number of subframes within a frame (10) is 40, resource allocation can be carried out according to the TDM scheme, starting from the first subframe of a frame of which the SFN is divided by 4.

The resource allocation unit may be configured as a multiple of 8. For example, the resource allocation unit can be configured by the least common multiple of 8 ms and the length of one frame 10 ms, which is 40 ms. At this time, subframes allocated to each site can be specified through a 40-bit bitmap. The method above can also be applied to the TDD system.

Division of resources can be carried out according to the DL traffic/UL traffic of each cell separately for DL HARQ/UL HARQ. However, for detection of downlink channels in the same subframe and transmission of uplink channels within the same subframe, the DL HARQ and the UL HARQ can be configured as a pair.

Meanwhile, simultaneous transmission of PUCCH-PUSCH can always be allowed in the same UL subframe. This is so because in case the PUCCH is piggybacked on the PUSCH as scheduling information among different sites is unknown, the corresponding resources and the piggyback cannot be known.

Simultaneous transmission can also be configured for the case of PUCCH-PUSCH allocated to the same site to simplify the operation.

In case the CSI is piggybacked, piggyback of the CSI is punctured differently from the rate matching of uplink data mapping by taking into account the CSI information. While mapping of the coded symbol of the uplink data with respect to the PUSCH resource element in the area other than the PUSCH resource element to which the CSI is mapped varies according to the existence of the CSI in the case of rate matching, the mapping does not change according to the existence of the CSI in the case of puncturing.

<TDM According to HARQ Process Timing in the TDD System>

Different from the FDD system, in the TDD system, only one of the DL subframe and the UL subframe can exist within one subframe interval. Also, according to the UL-DL configuration, the ratio of the DL subframe to the UL subframe can set to be different from 1.

Therefore, according to the UL-DL configuration, reception of the PDSCH; transmission of the ACK/NACK; timing of PDSCH retransmission and transmission of the PUSCH, reception of the UL grant/PHICH, and timing of PUSCH retransmission are changed. This property has already been described with reference to FIGS. 8-10, 12, and 13.

As described above, in the TDD system, the DL HARQ period changes according to the UL-DL configuration. For efficient distribution of the DL HARQ process, the resource allocation unit can be composed on the basis of the number of DL subframes within the DL HARQ period (namely, the maximum number of DL HARQ processes). A bitmap can be used to inform each site of the resource allocation unit, and the number of bits constituting the bitmap can be the same as the number of DL subframes within the DL HARQ process period.

The table below shows the maximum number of DL HARQ processes for each UL-DL configuration.

TABLE 4

| UL-DL Configuration | # of DL subfames in a frame (A) | Max DL HARQ (B) | LCM of A & B | # of Frame |
|---|---|---|---|---|
| 0 | 4 | 4 | 4 | 1 (10 msec) |
| 1 | 6 | 7 | 42 | 7 (70 msec) |
| 2 | 8 | 10 | 40 | 5 (50 msec) |
| 3 | 7 | 9 | 63 | 9 (90 msec) |
| 4 | 8 | 12 | 24 | 3 (30 msec) |
| 5 | 9 | 15 | 45 | 5 (50 msec) |
| 6 | 5 | 6 | 30 | 6 (60 msec) |

As described in the FDD system, in case the HARQ period is not 10 ms, alignment of a frame and the subframe which is time-division multiplexed at the HARQ period may be needed during TDM period configuration. To this purpose, subframe mapping can be carried out by using System Frame Number (SFN) as a parameter. For example, the alignment can be carried out by using the number (C) of DL subframes as a period, which is determined by the least common multiple of the DL HARQ period (B) and the number (A) of DL subframes existing within one frame.

In the case of UL-DL configuration 1 of Table 4 above, 6 DL subframes are defined for one frame, and the HARQ period is 7 ms. Therefore, the Least Common Multiple (LCM) becomes 42. The 42 DL subframes are included within a total of 7 frames. In this case, the resource allocation unit used commonly for multiple sites can be composed of 7 frames (70 ms).

In other words, the resource allocation unit for multiple sites which employ the TDD system can be determined by the number of frames including as many downlink subframes as the least common multiple of the number of downlink subframes included in one frame and the maximum number of downlink HARQ processes.

The resource allocation unit can apply the values determined in a particular UL-DL configuration to other UL-DL configurations to simplify the composition of the resource allocation unit.

As described above, the resource allocation unit can be determined on the basis of the DL HARQ period and the number of DL HARQ processes. Subframes distributed to individual sites within the resource allocation unit are first determined on the basis of the PDSCH, and the PUCCH subframes to which the ACK/NACK with respect to the PDSCH is transmitted can be determined.

The following table shows a correspondence relationship between the UL subframe n and the DL subframe n-$k_m$ for each UL-DL configuration. In other words, the relationship indicates that the ACK/NACK with respect to the PDSCH transmitted from the subframe n-$k_m$ is transmitted from the UL subframe n.

When TDM is employed for independent scheduling in the multiple sites, PUCCH resources may collide with each other. To avoid collision, a TDM method which uses a set of DL subframes corresponding to the PUCCH transmission UL subframes can be applied. Therefore, according to division of a UL subframe to which the PUCCH is transmitted, division of a DL subframe to which the PDSCH is transmitted can be determined. This scheme can be applied only to the UL-DL configuration 1, 2, 3, 4, and 5 where multiple DL subframes correspond to one UL subframe since the number of UL subframes is larger than the number of DL subframes.

In what follows, a method for determining a resource allocation unit by taking into account the UL synchronized HARQ will be described.

For efficient distribution of the UL HARQ process, the resource allocation unit can be determined on the basis of the number of UL subframes within the UL HARQ period. In other words, the resource allocation unit can be determined on the basis of the number of UL HARQ processes. If the resource allocation unit is specified through a bitmap for each site, the number of bits of the bitmap can be the same as the number of UL subframes within the UL HARQ period.

The following table shows the maximum number of UL HARQ processes determined for each UL-DL configuration.

TABLE 6

| UL-DL Configuration | # of UL subfames in a frame (A) | Max UL HARQ (B) | LCM of A & B (C) | # of Frame |
|---|---|---|---|---|
| 0 | 6 | 7 | 42 | 7 (70 msec) |
| 1 | 4 | 4 | 4 | 1 (10 msec) |
| 2 | 2 | 2 | 2 | 1 (10 msec) |
| 3 | 3 | 3 | 3 | 1 (10 msec) |
| 4 | 2 | 2 | 2 | 1 (10 msec) |
| 5 | 1 | 1 | 1 | 1 (10 msec) |
| 6 | 5 | 6 | 30 | 6 (60 msec) |

Meanwhile, in case the HARQ period is not 10 ms, alignment of a frame and the subframe which is time-division multiplexed at the HARQ period may be needed during TDM period configuration. To this purpose, subframe mapping can be carried out by using System Frame Number (SFN) as a parameter.

For example, the alignment can be carried out by using the number (C) of UL subframes as a period, which is determined by the least common multiple of the UL HARQ period (B) measured by the number of UL subframes and the number (A) of UL subframes existing within one frame.

In the case of UL-DL configuration 0 of Table 6 above, 6 UL subframes are defined for one frame, and the HARQ

TABLE 5

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — | period is 7 ms. Therefore, the Least Common Multiple (LCM) becomes 42. The 42 subframes are converted to a total of 7 frames. Therefore, the resource allocation unit can be composed of 7 frames.

The resource allocation unit can apply the values determined in a particular UL-DL configuration to other UL-DL configurations to simplify the composition of the resource allocation unit. In particular, in the case of UL-DL configurations 1 to 5, the period can be determined as a multiple of 10 ms (for example, 20 ms) by taking into account association with the DL asynchronous HARQ.

According to division of the UL subframe for PUSCH transmission, the UL grant/PHICH transmission DL subframe can be determined. In case the UL-DL configuration is 0, the number of UL subframes is larger than the number of DL subframes; thus, the UL grant/PHICH transmission DL subframe has to be configured so as to avoid collision during transmission of a UL grant in the DL subframe corresponding to multiple UL subframes.

From the UL subframe index field, only the bit corresponding to the UL subframe allocated through TDM can be used for scheduling.

Meanwhile, in the case of PHICH, the DL subframe corresponding to multiple UL subframes is classified as the resource which does not cause collision for each UL subframe due to application of $I_{PHICH}$.

Therefore, in case E-PHICH is introduced, it is necessary to set up independent resources in the corresponding subframe according to $I_{PHICH}$.

Similarly, resources can be classified according to the PHICH resources, and TDM of the UL subframe corresponding to the classification can be carried out.

In the case of the TDD system, the interval between the PDSCH transmission DL subframe according to the DL HARQ and the PUCCH transmission UL subframe may differ from the interval between the PUSCH transmission UL subframe according to the UL HARQ and the UL grant/PHICH transmission DL subframe. Therefore, alignment among the frames is difficult to achieve. It is preferable to configure the TDM of the channel associated with the DL HARQ and the TDM of the channel associated with the UL HARQ independently from each other.

The present invention provides a criterion and a method for allocating resources efficiently when the resources are allocated according to the TDM scheme to multiple sites using the same frequency band.

Figure 18:
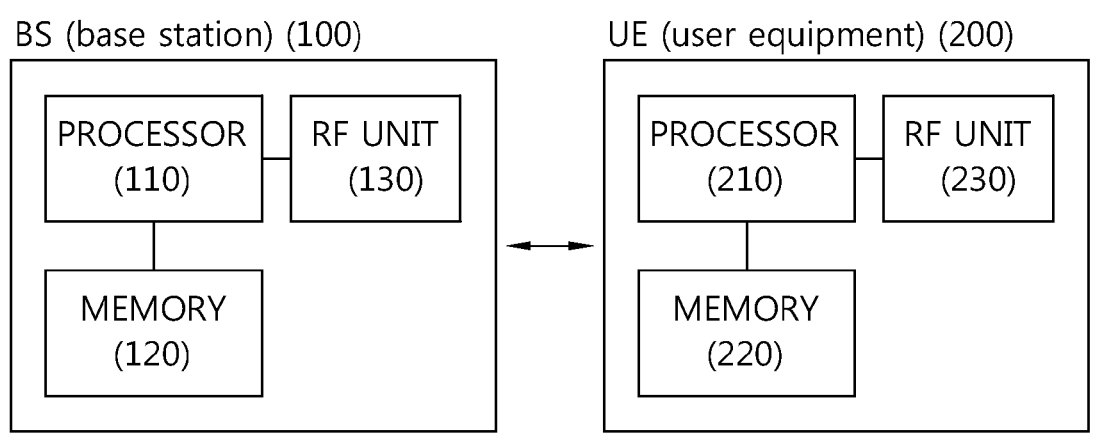
FIG. 18 is a block diagram illustrating a wireless device to which an embodiment of the present invention is applied.

FIG. 18 is a block diagram illustrating a wireless device to which an embodiment of the present invention is applied.

Each site can have a base station and a user equipment.

A base station (BS) 100 includes a processor 110, a memory 120, and an RF (radio frequency) unit 130. The processor 110 implements proposed functions, processes and/or methods. The memory 120 is connected to the processor 110 and stores various types of information for driving the processor 110. The RF unit 130 is connected to the processor 110, and transmits and/or receives radio signals. A particular base station can allocate resources to other base stations using the same frequency band on the basis of resource allocation units.

A UE 200 includes a processor 210, a memory 220, and an RF unit 230. The processor 210 implements proposed functions, processes and/or methods. The memory 220 is connected to the processor 210, and stores various types of information for driving the processor 210. The RF unit 230 is connected to the processor 210, and transmits and/or receives radio signals.

The processor 110, 210 may include Application-Specific Integrated Circuits (ASICs), other chipsets, logic circuits, data processing devices and/or converters for mutually converting baseband signals and radio signals. The memory 120, 220 may include Read-Only Memory (ROM), Random Access Memory (RAM), flash memory, memory cards, storage media and/or other storage devices. The RF unit 130, 230 may include one or more antennas for transmitting and/or receiving radio signals. When an embodiment is implemented in software, the above-described scheme may be implemented as a module (process, function, etc.) for performing the above-described function. The module may be stored in the memory 120, 220 and executed by the processor 110, 210. The memory 120, 220 may be placed inside or outside the processor 110, 210 and connected to the processor 110, 210 using a variety of well-known means.

What is claimed is:

1. A method for allocating radio resources to multiple sites using a same frequency band, the method comprising:
determining a fixed number of subframes used commonly among the multiple sites, the fixed number of subframes determined based on a Hybrid Automatic Repeat reQuest (HARQ) period for each of the multiple sites such that the determination is different for a Frequency Division Duplex (FDD) scheme and a Time Division Duplex (TDD) scheme;
allocating resources to the multiple sites according to the determined fixed number of subframes; and
transmitting information between a base station (BS) and a user equipment (UE) at each of the multiple sites by using the determined fixed number of subframes such that radio resources allocated to each of the multiple sites are distributed and separated in a time domain,
wherein first subframes used for communication between a first BS and a first UE located at a first site and second subframes used for communication between a second BS and a second UE located at a second site do not overlap in the time domain within the determined fixed number of subframes.

2. The method of claim 1, wherein the fixed number of subframes is further determined based on a number of downlink subframes that is a least common multiple of a number of downlink subframes included in one frame and a maximum number of downlink HARQ processes.

3. The method of claim 1, wherein the first subframes and the second subframes are allocated according to a predetermined pattern within the determined fixed number of subframes.

4. An apparatus for allocating radio resources to multiple sites using a same frequency band, the apparatus comprising:
a Radio Frequency (RF) unit configured to transmit and receive radio signals; and
a processor connected to the RF unit and configured to:
determine a fixed number of subframes used commonly among the multiple sites, the fixed number of subframes determined based on a Hybrid Automatic Repeat reQuest (HARQ) period for each of the multiple sites such that the determination is different for a Frequency Division Duplex (FDD) scheme and a Time Division Duplex (TDD) scheme;
allocate resources to the multiple sites according to the determined fixed number of subframes,
control the RF unit to transmit information between a base station (BS) and a user equipment (UE) at each of the multiple sites by using the determined fixed number of subframes such that radio resources allocated to each of the multiple sites are distributed and separated in a time domain, wherein first subframes used for communication between a first (BS) and a first (UE) located at a first site and second subframes used for communication between a second (BS) and a second (UE) located at a second site do not overlap in the time domain within the determined fixed number of subframes.

5. The apparatus of claim 4, wherein the fixed number of subframes is further determined based on a number of frames including a number of downlink subframes that is a least common multiple of a number of downlink subframes included in one frame and a maximum number of downlink HARQ processes.

6. The apparatus of claim 4, wherein the first subframes and the second subframes are allocated according to a predetermined pattern within the determined fixed number of subframes.

* * * * *